(12) United States Patent
Kato et al.

(10) Patent No.: US 11,748,826 B2
(45) Date of Patent: Sep. 5, 2023

(54) CONSTRUCTION SITE MANAGEMENT DEVICE AND CONSTRUCTION SITE MANAGEMENT SYSTEM

(71) Applicant: HITACHI CONSTRUCTION MACHINERY CO., LTD., Tokyo (JP)

(72) Inventors: Seiya Kato, Tokyo (JP); Hiroshi Watanabe, Tsuchiura (JP); Eiji Egawa, Tsuchiura (JP); Tsuyoshi Fujita, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 278 days.

(21) Appl. No.: 16/755,603

(22) PCT Filed: Feb. 20, 2019

(86) PCT No.: PCT/JP2019/006414
§ 371 (c)(1),
(2) Date: Apr. 13, 2020

(87) PCT Pub. No.: WO2019/187820
PCT Pub. Date: Oct. 3, 2019

(65) Prior Publication Data
US 2020/0327464 A1 Oct. 15, 2020

(30) Foreign Application Priority Data
Mar. 29, 2018 (JP) .................. 2018-065933

(51) Int. Cl.
*G06Q 50/08* (2012.01)
*G06Q 10/0631* (2023.01)
(Continued)

(52) U.S. Cl.
CPC ......... *G06Q 50/08* (2013.01); *G06Q 10/0631* (2013.01); *G06Q 10/1091* (2013.01);
(Continued)

(58) Field of Classification Search
CPC .......... G06Q 10/0631; G06Q 10/1091; G06Q 50/08; G06Q 50/28; G07C 5/085;
(Continued)

(56) References Cited

U.S. PATENT DOCUMENTS

2006/0243056 A1* 11/2006 Sundermeyer ........... G01N 3/32
73/760
2016/0292920 A1* 10/2016 Sprock .................... G06T 13/20
2019/0180627 A1* 6/2019 Talmaki ............. G06Q 10/0838

FOREIGN PATENT DOCUMENTS

JP 10-283518 A 10/1998
JP 2005-036477 A 2/2005
(Continued)

OTHER PUBLICATIONS

Lu, et al., Positioning and Tracking Construction Vehicles in Highly Dense Urban Areas and Building Construction Sites, 16 Automation in Construction 647 (2007) (Year: 2007).*
(Continued)

*Primary Examiner* — Charles Guiliano
(74) *Attorney, Agent, or Firm* — MATTINGLY & MALUR, PC

(57) ABSTRACT

A construction site management device receives operation information indicating an operation content of a loading machine, and positional information sent from a haulage vehicle; stores a positional history, and stores an operation history. The operation history includes a content of work of the loading machine performed in a work area and information of time when the work has been performed. Haulage history indicates when the haulage vehicle has entered the work area, and loading history indicates the time when the loading machine has performed loading work for the haulage vehicle and a work area in which the loading machine has performed the loading work for the haulage vehicle. The loading history is created on the basis of the haulage history (Continued)

and the operation history; and work result data indicating from which work area to which work area a load has been hauled is output.

6 Claims, 18 Drawing Sheets

(51) Int. Cl.
  *G06Q 10/1091* (2023.01)
  *G06Q 50/28* (2012.01)
  *G08G 1/00* (2006.01)
  *G07C 5/08* (2006.01)
(52) U.S. Cl.
  CPC .......... *G06Q 50/28* (2013.01); *G07C 5/0841* (2013.01); *G08G 1/20* (2013.01); *G08G 1/205* (2013.01)
(58) Field of Classification Search
  CPC ........ G07C 5/0841; G08G 1/20; G08G 1/205; E02F 9/26
  USPC ........................................... 705/7.12
  See application file for complete search history.

(56) References Cited

FOREIGN PATENT DOCUMENTS

| | | |
|---|---|---|
| JP | 2010-073031 A | 4/2010 |
| JP | 2014-043682 A | 3/2014 |
| JP | 2016-057882 A | 4/2016 |
| JP | 5973676 B2 | 8/2016 |
| JP | 6199449 B2 | 9/2017 |
| WO | 2015/151359 A1 | 10/2015 |
| WO | 2016/199941 A1 | 12/2016 |
| WO | 2017/061517 A1 | 4/2017 |

OTHER PUBLICATIONS

Extended European Search Report received in corresponding European Application No. 19775106.8 dated Aug. 2, 2021.
International Search Report of PCT/JP2019/006414 dated May 21, 2019.
Korean Office Action received in corresponding Korean Application No. 10-2020-7006525 dated May 17, 2022.

* cited by examiner

FIG. 4

| # | 411 LOADING AREA | 412 DUMPING AREA | 413 HAULING AMOUNT [t] | 414 HAULING AMOUNT [m³] |
|---|---|---|---|---|
| 1 | LOADING AREA A | WORK SITE E | 20 | 13.2 |
| 2 | LOADING AREA A | UNKNOWN | 10 | 0.0 |
| 3 | WORK SITE D | WORK SITE E | 10 | 6.6 |
| 4 | WORK SITE D | DUMPING AREA B | 20 | 8.0 |
| 5 | WORK SITE D | DUMPING AREA C | 10 | 6.6 |
| 6 | UNKNOWN | DUMPING AREA B | 0 | 0 |
| 7 | UNKNOWN | DUMPING AREA C | 0 | 0 |
| 8 | UNKNOWN | WORK SITE E | 10 | 6.6 |

DAILY REPORT — 400

| SITE NAME | SITE ABC | DATE | 2018/xx/xx |
|---|---|---|---|

PROGRESS

FIG. 5

| \_500 | | | | | | |
|---|---|---|---|---|---|---|
| WORK DAILY REPORT | | | | | | |
| SITE NAME | SITE ABC 501 | | | DATE | 2018/xx/xx 504 | |
| DUMP TRUCK NAME | DUMP TRUCK 2A 502 | | | DRIVER | WORKER A 505 | |
| OPERATION TIME | 08:00 ~ 17:30 503 | | | BREAK TIME | 12:10-13:05 506 | |

| # | 511<br>LOADING TIME | 512<br>LOADING AREA | | 513<br>DUMPING TIME | 514<br>DUMPING AREA | 515<br>HAULING AMOUNT [t] | 516<br>HAULING AMOUNT [m³] |
|---|---|---|---|---|---|---|---|
| 1 | 08:40 | WORK SITE D | ⇒ | 09:40 | DUMPING AREA B | 10 | 4.0 |
| 2 | 13:00 | WORK SITE D | ⇒ | 13:40 | DUMPING AREA C | 10 | 6.6 |
| 3 | - | UNKNOWN | ⇒ | 15:00 | WORK SITE E | 10 | 6.6 |
| 4 | 16:30 | LOADING AREA A | ⇒ | - | UNKNOWN | 10 | - |
| 5 | | | | | | | |

FIG. 6

WORK DAILY REPORT

| SITE NAME | SITE ABC 601 | DATE | 2018/xx/xx 605 |
|---|---|---|---|
| HEAVY EQUIPMENT NAME | EXCAVATOR 1A 602 | DRIVER | OPERATOR A 606 |
| HEAVY EQUIPMENT WORK TIME | 06:00 603 | BREAK TIME | 607<br>12:00 ~ 13:00 |
| NON HEAVY EQUIPMENT WORK TIME | 02:00 604 | | |

611
WORK BREAKDOWN

| # | START TIME | END TIME | WORK CLASSIFICATION | WORK DETAIL | WORK LOCATION |
|---|---|---|---|---|---|
| 1 | 08:30 | 12:00 | HEAVY EQUIPMENT WORK | LOADING | WORK SITE D |
| 2 | 13:00 | 14:00 | HEAVY EQUIPMENT WORK | LOADING | WORK SITE D |
| 3 | 14:00 | 16:00 | NON HEAVY EQUIPMENT WORK | | WORK SITE D |
| 4 | 16:00 | 17:30 | HEAVY EQUIPMENT WORK | SLOPE WORK | WORK SITE D |
| 5 | | | | | |

621
OUTBOUND TRANSPORT WORK BREAKDOWN

| # | LOADING TIME | LOADING AREA | LOADING TARGET | DUMPING AREA | HAULING AMOUNT [t] | HAULING AMOUNT [m³] |
|---|---|---|---|---|---|---|
| 1 | 08:40 | WORK SITE D | DUMP TRUCK 2A | DUMPING AREA B | 10 | 4.0 |
| 2 | 11:00 | WORK SITE D | DUMP TRUCK 2B | DUMPING AREA B | 10 | 4.0 |
| 3 | 11:30 | WORK SITE D | DUMP TRUCK 2C | WORK SITE E | 10 | 6.6 |
| 4 | 13:00 | WORK SITE D | DUMP TRUCK 2A | DUMPING AREA C | 10 | 6.6 |
| 5 | | | | | | |

SITE INFORMATION
                                                            232

| 701 | 702 | 703 | 704 | 705 | 706 |
|---|---|---|---|---|---|
| ID | AREA NAME | AREA TYPE | SYSTEM SUPPORT | COORDINATES | SPECIFIC GRAVITY |
| 1 | LOADING AREA A | LOADING AREA | SUPPORTING | $a_1(x_1,y_1)$, $a_2(x_2,y_2)$,... | - |
| 2 | DUMPING AREA B | DUMPING AREA | NON SUPPORTING | (),(),(),() | 1.7 |
| 3 | DUMPING AREA C | DUMPING AREA | SUPPORTING | (),(),(),() | 1.7 |
| 4 | WORK SITE D | WORK SITE (EXCAVATION) | SUPPORTING | (),(),(),() | - |
| 5 | WORK SITE E | WORK SITE (FILL) | NON SUPPORTING | (),(),(),() | 1.7 |

FIG. 8

OPERATION HISTORY — 233

| 801 ID | 802 TARGET | 803 START TIME | 804 END TIME | 805 STATE | 806 LOCATION |
|---|---|---|---|---|---|
| 1 | EXCAVATOR 1A | 08:30 | 12:00 | LOADING | WORK SITE D |
| 2 | EXCAVATOR 1A | 13:00 | 14:00 | LOADING | WORK SITE D |
| 3 | EXCAVATOR 1A | 16:00 | 16:30 | EXCAVATION | WORK SITE D |
| 4 | EXCAVATOR 1A | 16:30 | 17:30 | SLOPE WORK | WORK SITE D |
| 5 | ... | | | | |
| 6 | | | | | |
| 7 | | | | | |

FIG. 9

DUMP TRUCK HAULAGE HISTORY — 235

| 901 ID | 902 TARGET DUMP TRUCK | 903 START TIME | 904 END TIME | 905 STOP TIME [SECONDS] | 906 STATE | 907 LOCATION |
|---|---|---|---|---|---|---|
| 1 | DUMP TRUCK 2A | 08:30 | 08:40 | 180 | DETECTED | WORK SITE D |
| 2 | DUMP TRUCK 2A | 09:40 | 09:45 | 120 | NOT DETECTED | DUMPING AREA B |
| 3 | DUMP TRUCK 2B | 10:45 | 11:00 | 300 | DETECTED | WORK SITE D |
| 4 | DUMP TRUCK 2C | 11:23 | 11:30 | 100 | DETECTED | WORK SITE D |
| 5 | DUMP TRUCK 2A | 13:00 | 13:10 | 120 | DETECTED | WORK SITE D |
| 6 | DUMP TRUCK 2A | 13:40 | 13:48 | 180 | DETECTED | DUMPING AREA C |
| 7 | DUMP TRUCK 2A | 14:00 | 14:03 | 60 | NOT DETECTED | DUMPING AREA B |
| 8 | DUMP TRUCK 2A | 15:00 | 15:10 | 120 | DETECTED | WORK SITE E |
| | ... | | | | | |
| | | | | | | |

FIG.10

EXCAVATOR LOADING HISTORY                              236

| 1001 | 1002 | 1003 | 1004 | 1005 | 1006 |
|---|---|---|---|---|---|
| ID | TARGET EXCAVATOR | START TIME | END TIME | TARGET HAULAGE HISTORY | LOCATION |
| 1 | EXCAVATOR 1A | 08:30 | 08:40 | 1 | WORK SITE D |
| 2 | EXCAVATOR 1A | 10:45 | 11:00 | 3 | WORK SITE D |
| 3 | EXCAVATOR 1A | 11:23 | 11:30 | 4 | WORK SITE D |
| 4 | EXCAVATOR 1A | 13:00 | 13:10 | 5 | WORK SITE D |
| | ... | | | | |
| | | | | | |
| | | | | | |

FIG.19

● CASE 19-A

LOADING AREA OR WORK SITE (EXCAVATION)   A (RELIABILITY LEVEL HIGH/MIDDLE)
⇒LOADING AREA OR WORK SITE (EXCAVATION)   B (RELIABILITY LEVEL HIGH/MIDDLE)
⇒DUMPING AREA OR WORK SITE (FILL)   C (RELIABILITY LEVEL HIGH/MIDDLE)
⇒DUMPING AREA OR WORK SITE (FILL)   D (RELIABILITY LEVEL HIGH/MIDDLE)

<u>CORRECTION RESULT OF CASE 19-A</u>

A (RELIABILITY LEVEL HIGH/MIDDLE) ⇒ DUMPING AREA (UNKNOWN) ⇒
B (RELIABILITY LEVEL HIGH/MIDDLE) ⇒
C (RELIABILITY LEVEL HIGH/MIDDLE) ⇒ LOADING AREA (UNKNOWN) ⇒
D (RELIABILITY LEVEL HIGH/MIDDLE)

● CASE 19-B

LOADING AREA OR WORK SITE (EXCAVATION)   A (RELIABILITY LEVEL HIGH/MIDDLE)
⇒LOADING AREA OR WORK SITE (EXCAVATION)   B (RELIABILITY LEVEL LOW)
⇒DUMPING AREA OR WORK SITE (FILL)   C (RELIABILITY LEVEL HIGH/MIDDLE)
⇒DUMPING AREA OR WORK SITE (FILL)   D (RELIABILITY LEVEL LOW)

<u>CORRECTION RESULT OF CASE 19-B</u>

A (RELIABILITY LEVEL HIGH/MIDDLE) ⇒ C (RELIABILITY LEVEL HIGH/MIDDLE)

● CASE 19-C

LOADING AREA OR WORK SITE (EXCAVATION)   A (RELIABILITY LEVEL LOW)
⇒LOADING AREA OR WORK SITE (EXCAVATION)   B (RELIABILITY LEVEL HIGH/MIDDLE)
⇒DUMPING AREA OR WORK SITE (FILL)   C (RELIABILITY LEVEL LOW)
⇒DUMPING AREA OR WORK SITE (FILL)   D (RELIABILITY LEVEL HIGH/MIDDLE)

<u>CORRECTION RESULT OF CASE 19-C</u>

B (RELIABILITY LEVEL HIGH/MIDDLE) ⇒ D (RELIABILITY LEVEL HIGH/MIDDLE)

CONSTRUCTION SITE MANAGEMENT DEVICE AND CONSTRUCTION SITE MANAGEMENT SYSTEM

TECHNICAL FIELD

The present invention relates to a technology of creating work result data for construction site management.

BACKGROUND ART

Typically, at a construction site, a dump truck is used to carry earth, an excavator is used to fill by using the carried earth, and earth excavated by the excavator is loaded onto a dump truck, and is hauled to a designated dumping area. Finally, a bank is formed or excavation is performed to thereby form a targeted shape such as an embankment or a road.

At such a construction site, it is necessary to manage the daily work progress, and examples of reference measurements for progress management include hauling amounts of earth. In addition, daily working hours are managed for calculating wages of employees. Hitherto, hand-written daily reports are used for these types of management. However, at sites, it is difficult for heavy equipment operators and dump truck drivers to fill in daily reports whenever tasks are done during work. Accordingly, it is often the case that they fill in the daily reports at once at the end of the day, giving a rise to a problem that they do not remember details about time, and fail to write correct reports. In addition, knowing the progress about how much earth was carried from where to where necessitates a site supervisor to put daily reports of each and every person in order and check them, and a lot of time is required.

In addition, the haulage costs of earth and the receiving costs of earth differ depending on start points of haulage of the earth and destinations of haulage of the earth. Therefore, it is necessary to accurately manage start points of haulage of earth and destinations of haulage of earth, and aggregate and bill the costs for each start point of haulage or each destination of haulage.

As one of conventional technologies, for example, there is a method disclosed in Patent Literature 1 in which a receiver for the GPS (Global Positioning System) is attached to heavy equipment, and past histories are automatically output as forms on the basis of coordinates obtained through the GPS. In addition, there is a method disclosed in Patent Literature 2 in which work of heavy equipment is estimated on the basis of sensor information obtained from the heavy equipment, in order to determine not only positions simply, but the types of work. In addition, there is a method disclosed in Patent Literature 3 in which the presence or absence of loading work is estimated from relative distances between excavators and dump trucks.

CITATION LIST

Patent Literature

PATENT LITERATURE 1: Japanese Patent Application Laid-Open No. 2005-36477
PATENT LITERATURE 2: Japanese Patent Application Laid-Open No. Hei 10-283518
PATENT LITERATURE 3: Japanese Patent No. 5973676

SUMMARY OF INVENTION

Technical Problem

Although daily reports of work of individual units of heavy equipment can be generated by conventional methods, it is necessary after all to check and aggregate each and every daily report in order to know how much earth was moved from where to where at a site. In addition, there are cases where the specific gravity of hauled earth differs significantly even within the same site, and it is difficult to know the amount of earth, as measured in $m^3$, that was excavated and hauled out or hauled in and piled up, which information is important for knowing the progress of engineering work. Furthermore, positional information generated by positioning on the basis of the GPS has errors. There is a possibility that, depending on a location, it is not possible to correctly detect that a unit of equipment was at a position of interest, and there is a possibility that errors are generated in a daily report. In addition, since there are a plurality of entities that proceed with engineering work at a site, it is not guaranteed that all the entities have installed the same system. While in some cases a relationship between excavators and dump truck like the one disclosed in Patent Literature 3 can be used, such a relationship cannot be used in other cases.

An object of the present invention is to provide a technology that allows output of highly precise work result data.

Solution to Problem

In order to solve the problem, a representative construction site management device of the present invention is a construction site management device that creates result data of load and haul between a plurality of work areas, the construction site management device including: a receiving section that receives operation information indicating an operation content of a loading machine in a work area sent from the loading machine and positional information sent from a haulage vehicle; a registering section that stores, in a storage device, a positional history on the basis of the positional information and an operation history on the basis of the operation information, the positional history including, in association with each other, a position of the haulage vehicle, and information of time when the haulage vehicle has been at the position, the operation history including, in association with each other, a content of work of the loading machine performed in the work area, and information of time when the work has been performed; a history creating section that creates a haulage history indicating time when the haulage vehicle has entered the work area on the basis of the positional history, and creates a loading history indicating time when the loading machine has performed loading work for the haulage vehicle, and a work area in which the loading machine has performed the loading work for the haulage vehicle, the loading history being created on the basis of the haulage history and the operation history; and a work result data creating section that outputs work result data indicating from which work area to which work area a load has been hauled, the work result data being output on the basis of the haulage history and the loading history that are created by the history creating section.

Advantageous Effects of Invention

Highly precise work result data can be output, and management tasks can be reduced.

Problems, configurations and effects other than those explained above become apparent from the following explanation of an embodiment.

BRIEF DESCRIPTION OF DRAWINGS

FIG. 4 is a figure for explaining a daily report of the entire site in the embodiment.

FIG. 5 is a figure for explaining a daily report for a dump truck in the embodiment.

FIG. 6 is a figure for explaining a daily report for an excavator in the embodiment.

FIG. 8 is a figure for explaining an exemplary table configuration of an operation history in the embodiment.

FIG. 9 is a figure for explaining an exemplary table configuration of a dump truck haulage history in the embodiment.

FIG. 10 is a figure for explaining an exemplary table configuration of an excavator loading history in the embodiment.

FIG. 19 is a figure illustrating results of the reliability-based correction processes in the embodiment.

DESCRIPTION OF EMBODIMENT

Figure 1:
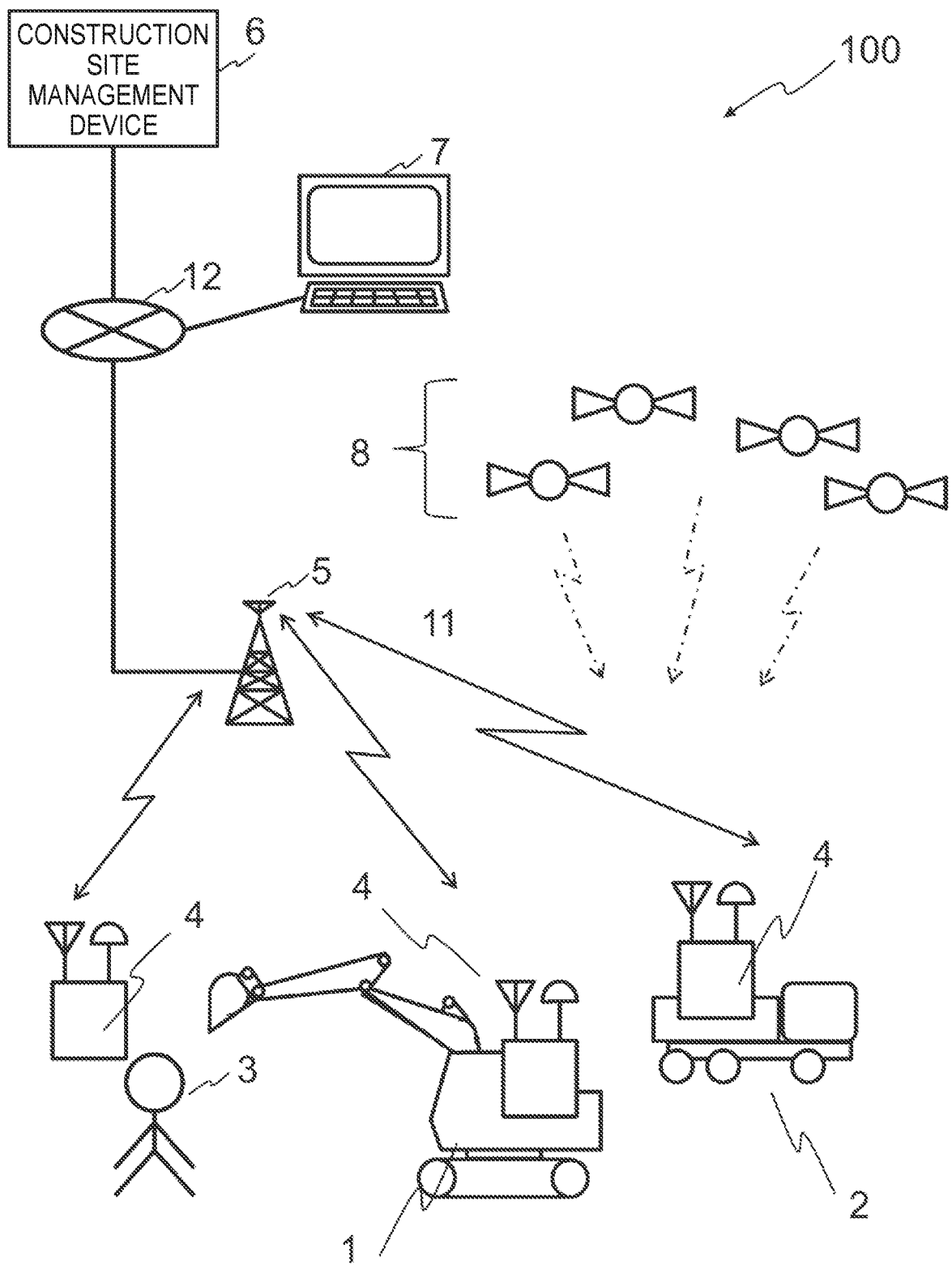
FIG. 1 is a figure for explaining an exemplary configuration of a construction site management system of an embodiment.

Hereinafter, an embodiment of the present invention is explained in detail by referring to the drawings. Note that those having the same functions are given the same reference signs throughout all the drawings for explaining the present embodiment, and repetitive explanations thereof are omitted in some cases.

FIG. 1 is a figure illustrating the configuration of a construction site management system including an entire construction site including a construction site management device of the present embodiment. It is assumed that a construction site management system 100 is used at a construction site. In addition, it is assumed that the construction site is an environment where one or more excavators 1 (loading machines), one or more dump trucks 2 (haulage vehicles) and persons 3 like workers and a site supervisor are mixedly present. The construction site management system 100 includes the excavators 1 and the dump trucks 2 at the site, the persons 3 like workers and a site supervisor, communication terminals 4 carried by the excavators 1, the dump trucks 2 and the persons 3, and an operation terminal 7 that is used to edit the settings of a construction site management device 6 and refer to daily reports and the like.

The communication terminals 4 are mounted on or owned by the excavators 1, the dump trucks 2 and the persons 3, use a satellite positioning system 8 such as the GPS (Global Positioning System) and measure the positions of themselves. In addition, the communication terminals 4 perform communication with the construction site management device 6, and sends at least positional information, and information of time when the communication terminals 4 were at the positions. Note that although it is assumed that the satellite positioning system such as the GPS is used in the present embodiment, another positioning method such as a method using beacons or the like may be used to measure the positions of the communication terminals 4.

The communication terminals 4 and the construction site management device 6 are configured to use a wireless band 11 for mobile phones, and to be connected through a base station 5 and a public line 12 for mobile phones. It should be noted, however, that the entire system may be constructed in the construction site, the construction site management device 6 may be installed in an intranet in the site, and a wireless LAN (Local Area Network) in the site may be used to perform communication between the communication terminals 4 and the construction site management device 6. The communication terminals 4 measure positional information of themselves, and regularly send the positional information, speeds, and identification information for identifying themselves (hereinafter, the term for the "identification information" is referred to as "IDs" as necessary) to the construction site management device 6. In the case discussed, the communication terminals 4 are smartphones, vehicle mounted dedicated terminals and the like, for example.

The operation terminal 7 is connected to the construction site management device 6 via the public line 12. The operation terminal 7 is a typically-used personal computer, a tablet, a smartphone or the like, and is a computer with which the construction site management device 6 is operated by using a dedicated application or a Web browser. In addition, although the communication terminals 4 and the operation terminal 7 are illustrated as separate terminals in FIG. 1, if a site supervisor uses, as a communication terminal 4, a terminal such as a smartphone into which a computer system is installed, it is also possible to use the smartphone as the operation terminal 7.

Figure 2:
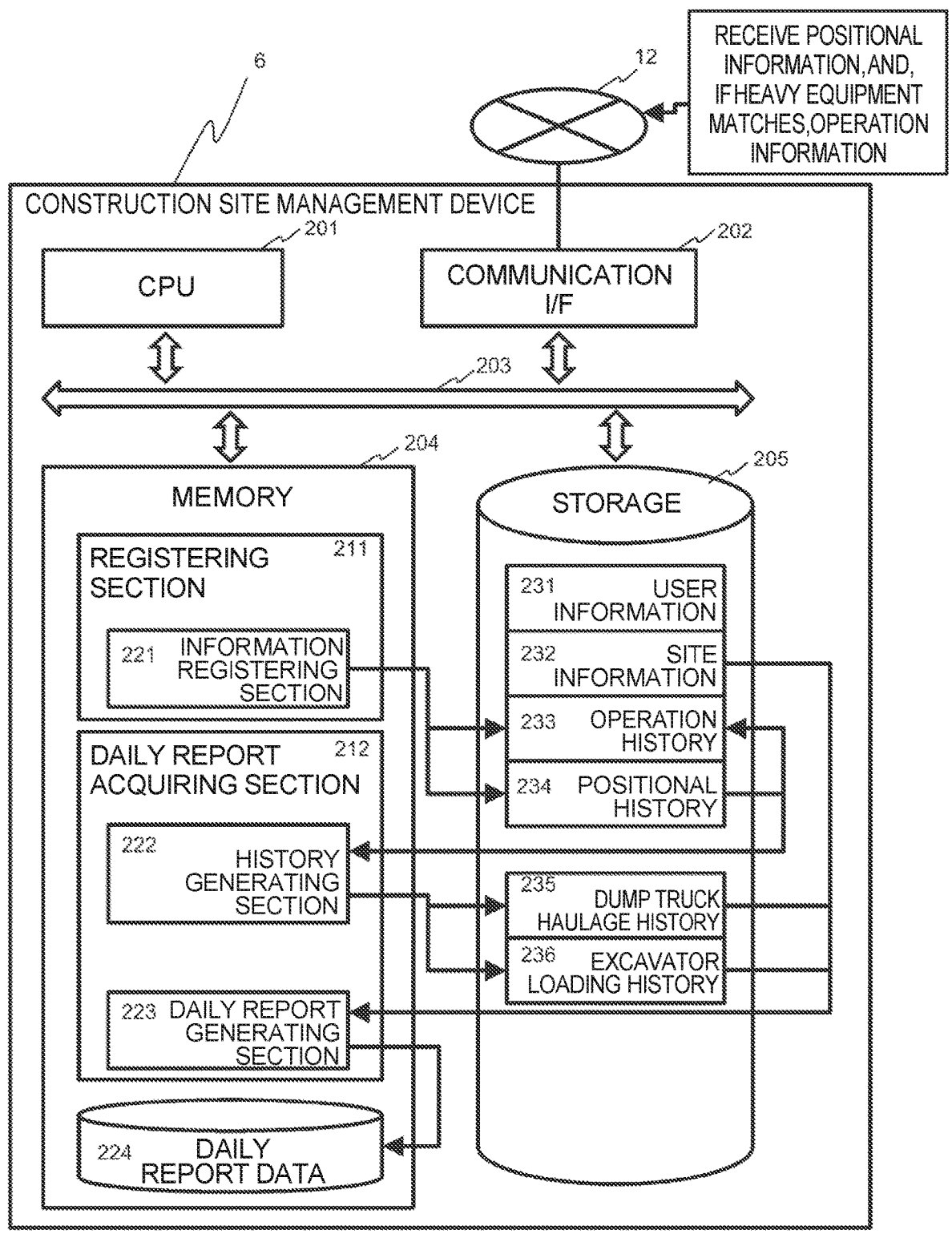
FIG. 2 is a figure illustrating an exemplary configuration of hardware/software of the embodiment.

FIG. 2 is a figure illustrating an exemplary configuration of the hardware and functions of the construction site management device 6. The construction site management device 6 has a CPU 201, a communicate I/F (Interface) 202 (receiving section), a memory 204 and a storage 205 (storage section), and includes an internal bus 203 connecting them. The construction site management device 6 is a typically-used personal computer or server as illustrated in FIG. 2. Note that although the storage 205 and the CPU for executing a program are illustrated in a single device in FIG. 2, they may be realized by using a plurality of devices, for example by realizing the storage 205 in a database server.

A registration program installed in advance into the storage 205 is copied to the memory 204, and arithmetic operation is executed by the CPU 201 to thereby realize a functional section of a registering section 211. A daily report acquiring program installed in advance into the storage 205 is copied to the memory 204, and arithmetic operation is executed by the CPU 201 to thereby realize a functional section of a daily report acquiring section 212. In addition, daily report data 224 is stored as primary data on the memory 204.

Other than the registration program and the daily report acquiring program that are explained above, user information 231, site information 232, an operation history 233, a positional history 234, a dump truck haulage history 235, and an excavator loading history 236 are stored on the storage 205.

The registering section 211 has an information registering section 221, and if positional information, operation information (mentioned below) and the like are received from a communication terminal 4, the registering section 211 registers relevant pieces of the information in the operation history 233 and the positional history 234 on the basis of the information.

The daily report acquiring section 212 has a history generating section 222 (history creating section) and a daily report generating section 223 (work result data creating section). If a request to acquire a daily report is received from the operation terminal 7, the daily report acquiring section 212 uses the history generating section 222 to generate the dump truck haulage history 235 and the excavator loading history 236 by referring to the operation history 233 and the positional history 234. Then, the daily report acquiring section 212 uses the daily report generating section 223 to generate the daily report data 224 by referring to the dump truck haulage history 235, the excavator loading history 236, and the site information 232. The daily report acquiring section 212 shapes the generated daily report data 224 into data for display, and outputs the data for display to the operation terminal 7.

The user information 231 is data registered in the construction site management device 6 in advance, and information that is set therefor includes information about: in which heavy equipment at the site a communication terminal 4 is mounted; by which person at the site a communication terminal 4 is worn; the type of the heavy equipment in which the communication terminal 4 is mounted; the type of the person by which the communication terminal 4 is worn; and parameters.

The site information 232 is data registered in the construction site management device 6 in advance, and data that is set therefor includes information about locations such as work areas, loading locations, dumping areas and the like in the construction site, and the specific gravity of earth. In addition, information that is set for the site information 232 also includes information about whether each work area is a location for which data other than positional information of a dump truck 2 (operation information explained below) is available for examining loading and dumping of earth and sand in order to increase the precision of decision about whether or not the dump truck 2 was in the work area when a daily report is generated. For example, information that is set therefor includes information about whether or not each work area is a loading area where an excavator 1 supporting the construction site management system 100 necessarily operates, and the like.

An excavator 1 supporting the construction site management system 100 has sensors mounted on parts thereof, and readings of the sensors are used as operation information, and sent to the construction site management device 6 along with times when the readings are acquired (time information). On the basis of the sensor values and the time information, the construction site management device 6 can identify a work content of the excavator 1 whether it is loading operation or slope shaping operation. The identification of work contents may be performed by using conventional technologies. In addition, if a sensor that can detect entrances and exits of dump trucks 2 is provided at a gate of a work area, the construction site management device 6 receives readings at the gate as operation information along with time information, and can perform entrance/exit time management. A work area provided with such a gate may be treated as an area supporting the construction site management system 100.

The operation history 233 is data registered whenever it is necessary by the registering section 211, and is registered on the basis of the operation information explained above sent from communication terminals 4 possessed by excavators 1 and dump trucks 2 operating at the construction site.

The positional history 234 is data registered whenever it is necessary by the registering section 211, and information registered therefor includes positional information (GPS positioning values, azimuths which excavators 1 and dump trucks 2 face, etc.) sent from communication terminals 4 possessed by the excavators 1, the dump trucks 2 and persons 3 operating at the construction site. The positional history 234 includes, for example, a communication terminal ID, time information, GPS positioning values, an azimuth and the like that are associated with each other to form one record.

The dump truck haulage history 235 is data registered by the daily report acquiring section 212, and information registered therefor includes information about when a dump truck 2 operating at the construction site moved from which work area to which work area.

The excavator loading history 236 is data registered by the daily report acquiring section 212, and information registered therefor includes information about when an excavator 1 operating at the construction site was at which area, and performing what type of work.

Specific examples of the site information 232, the operation history 233, the dump truck haulage history 235, and the excavator loading history 236 are explained below by using FIG. 7 to FIG. 10.

Figure 3:
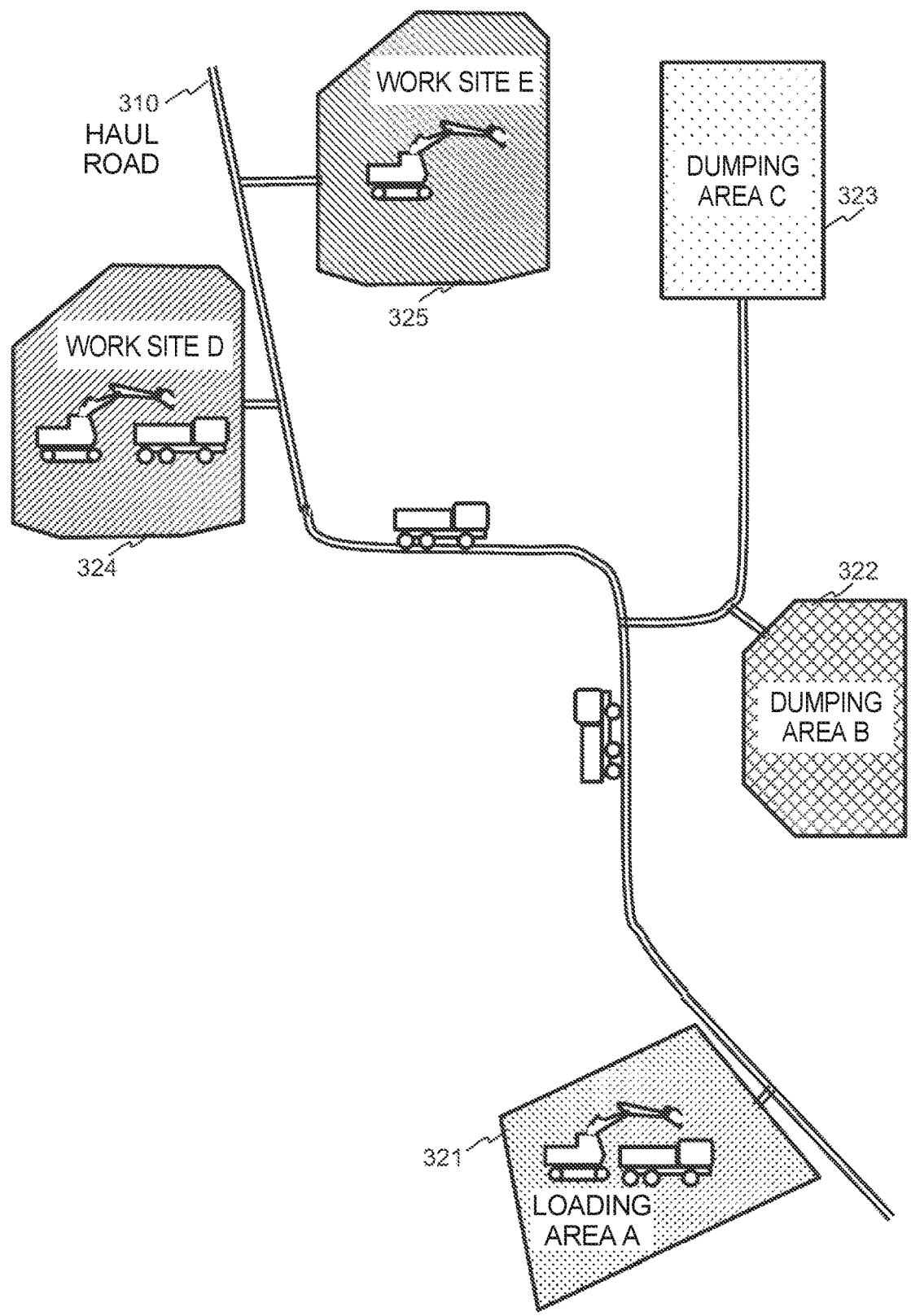
FIG. 3 is a figure for explaining an exemplary configuration of a construction site in the embodiment.

FIG. 3 is a FIG. illustrating an exemplary configuration of areas of the entire construction site of the present embodiment. The construction site includes a loading area A 321, a dumping area B 322, a dumping area C 323, a work site D 324, a work site E 325, and a haul road 310 connecting them. The configuration of each work area among them is registered as the site information 232 in the construction site management device 6. Note that each work area may be provided in the ground of the same construction site, or may be in another construction site or another facility (an industrial waste treatment plant, etc.) different from the construction site.

FIG. 4 illustrates a daily report, in the daily report data 224, which serves as a summary of the entire construction site. FIG. 5 illustrates a daily report, in the daily report data 224, of each dump truck 2 operating at the construction site, and FIG. 6 illustrates a daily report, in the daily report data 224, of each excavator 1 operating at the construction site. Each daily report illustrated in FIG. 4 to FIG. 6 is outcome data to be created finally at the construction site management system 100.

The summary daily report 400 illustrated in FIG. 4 includes a site name 401, a date 402, hauling amounts 413 and 414 from loading areas 411 to dumping areas 412 on the day.

A dump truck work daily report 500 illustrated in FIG. 5 includes items including a site name 501, a dump truck name 502, operation time 503, a date 504, a driver 505, and break time 506. In addition, the dump truck work daily report 500 includes, as work result data, data indicating when (loading time 511 and dumping time 513) haulage was performed from which loading area 512 to which dumping area 514 in what amounts (hauling amounts 515 and 516). Note that FIG. 5 illustrates that aggregation is performed for an item number 3 whose loading area 512 is unknown and an item number 4 whose dumping area 514 is unknown.

An excavator work daily report 600 illustrated in FIG. 6 includes items including a site name 601, a heavy equipment name 602, heavy equipment work time 603, non heavy equipment work time 604 (time when heavy equipment is not operating), a date 605, a driver 606, and a break time 607. The excavator work daily report 600 includes work breakdown data 611 indicating when and where the excavator 1 was performing what type of work, as illustrated by reference signs 612 to 616. In addition, as illustrated by reference signs 622 to 627, the excavator work daily report 600 includes outbound haulage work breakdown data 621 for cases when work details 615 are "loading." The outbound haulage work breakdown data 621 includes data indicating when loading work was perform for which dump truck, and from which loading area to which dumping area haulage was performed in what amount.

Figure 7:
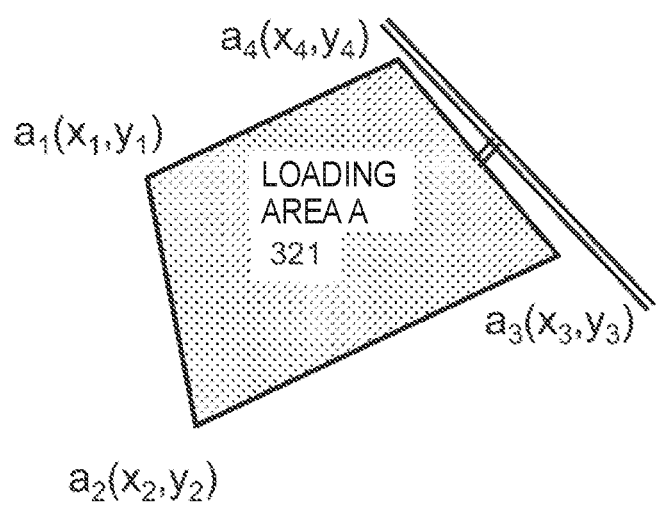
FIG. 7 is a figure for explaining an exemplary table configuration of site information in the embodiment.

FIG. 7 is a figure illustrating an exemplary data configuration of the site information 232, and the bottom portion of it illustrates a correspondence between an area and coordinates. The site information 232 includes IDs 701, area names 702, area types 703, system support 704, coordinates 705, and specific gravities 706. The IDs 701 are identifiers for uniquely identifying areas. The area names 702 indicate the names of set areas. When a report is output as a daily report, the values of the area names 702 are output therein.

The area types 703 indicate the types of areas. Types to be set include "loading area," "dumping area," "work site (excavation)," "work site (fill)." "Loading area" indicates a location where earth to be used in construction is placed, and the earth is loaded onto a dump truck 2. "Dumping area" indicates a location for scrapping/disposing of earth that is generated when excavation is performed at a construction site, and areas indicated thereby also include facilities other than a relevant construction site such as a disposal site for industrial wastes. "Work site (excavation)" indicates a location where excavation is performed among locations where structures such as embankments or roads are actually built by relevant construction work, and indicates a location where earth needs to be hauled from a relevant area to the outside in accordance with the work progress. "Work site (fill)" indicates a location where fill is performed among locations where structures such as embankments or roads are actually built at a relevant construction site. "Work site (fill)" also indicates a location where earth is hauled in from the outside depending on the work progress and the required volume, other than earth that is generated by excavation in the construction site.

The system support 704 indicates whether or not a work area of interest is an area which is supported by the construction site management system 100, and specifically indicates whether or not operation information explained above can be sent from the area. "Supporting" indicates an area where supported operation information can be acquired (supporting area), and "non supporting" indicates an area where supported operation information cannot be acquired (non supporting area). Information related to the system support 704 is set in advance, but can be corrected. Note that the construction site management device 6 may decide whether or not an excavator 1 is in a work area on the basis of positional information of the excavator 1 and coordinates 707, and the value of the system support 704 may be set dynamically depending on the decision. For example, if the excavator 1 is in a work area, the value of the system support 704 may be set to "supporting," and if the excavator 1 is not in a work area, the value of the system support 704 may be set to "non supporting."

For example, in the case of "Loading area A" with the ID 701 of "1," the area is set as a supporting area, indicating that an excavator 1 to be a management target in the present construction site management device 6 is necessarily used for loading work, and it is possible to examine on the basis of operation information such as a swing of the excavator 1 whether loading work was actually performed. On the other hand, in the case of "Dumping area B" with the ID 701 of "2," the area is a non supporting area, indicating that, other than positional information of a dump truck, the system cannot sense whether or not earth was dumped in the relevant area. In addition, in the case of the work site E with the ID 701 of "5," although the area is a location where an excavator is necessary since the area is a location where fill is performed, it is a non supporting area, indicating that another construction company is operating an excavator, and the activity of the excavator in the relevant area cannot be detected at the construction site management device 6.

The coordinates 705 are coordinate information for indicating the boundary of each work area. In the present embodiment, in the discussed example, a figure representing coordinates 705 is a polygon, and the latitude/longitude of each vertex is set to the coordinates 705 (see the bottom portion in FIG. 7). Note that since setting of an area is not limited to setting of a polygon, there are various possible setting manners such as setting a circle by using a center point and a radius. For example, the loading area A has a rectangular configuration composed of four points, and the latitude and longitude of each vertex are set for the coordinates 705 (see the bottom portion in FIG. 7).

The specific gravities of earth to be hauled to an area with an area type 703 of "dumping area" or "work site (fill)" are set for the specific gravities 706.

FIG. 8 is a figure illustrating an exemplary data configuration of the operation history 233. The operation history 233 includes IDs 801, targets 802, start times 803, end times 804, states 805, and locations 806.

The IDs 801 are identifiers for uniquely identifying operation histories. The targets 802 are the names of units of heavy equipment that performed relevant operation. The start times 803 indicate times at which relevant operation was started, and the end times 804 indicates times at which the relevant operation ended. The states 805 indicate contents and states of relevant work. The locations 806 indicate locations where relevant work was performed.

Here, the states 805 are additionally explained. In the present embodiment, data in the states 805 is derived on the basis of operation information sent from an excavator 1 as explained above. Although the states 805 are "loading," "excavation" and "slope work," derivation of each state is explained below by using FIG. 15. The states 805 are set in a case that the excavator 1 supports the construction site management system 100, that is, in a case that the excavator 1 sends operation information. Note that an area where the excavator 1 supporting the construction site management system 100 is arranged is an area whose system support 704 indicated in FIG. 7 is "supporting." In addition, an area where an excavator not supporting the construction site management system 100 is arranged is an area whose system support 704 indicated in FIG. 7 is "non supporting."

FIG. 9 is a figure illustrating an exemplary data configuration of the dump truck haulage history 235. The dump truck haulage history 235 includes IDs 901, target dump trucks 902, start times 903, end times 904, stop time [seconds] 905, states 906, and locations 907.

The IDs 901 are identifiers for uniquely identifying dump truck haulage histories. A different ID is given and managed in a different row every time a dump truck moves to a different area. The target dump trucks 902 indicate dump trucks that performed relevant haulage. The start times 903 indicate times at which the target dump trucks 902 entered relevant areas. The end times 904 indicate times at which the target dump trucks 902 went out of the relevant areas.

The stop time [seconds] 905 indicates lengths of time over which the target dump trucks 902 stopped in the relevant areas. The states 906 indicate whether or not information indicating that dump trucks were at the relevant locations at the relevant times is detected on the basis of operation histories of excavators and the like, other than positional histories of the dump trucks (positioning values of the GPS). "Detected" in the states 906 indicates that such information is detected, and "not detected" in the states 906 indicates that such information is not detected. The states 906 are derived from correspondence between operation information sent from excavators 1 and positional information sent from dump trucks 2. A technique of this derivation is explained below by using FIG. 11.

The locations 907 indicate work area names of locations where the target dump trucks 902 were at the relevant times.

FIG. 10 is a figure illustrating an exemplary data configuration of the excavator loading history 236. The excavator loading history 236 includes IDs 1001, target excavators 1002, start times 1003, end times 1004, target haulage histories 1005, and locations 1006.

The IDs 1001 are identifiers for uniquely identifying excavator loading histories. A different ID is given and managed in a different row every time an excavator performs loading for a dump truck. The target excavators 1002 indicate which excavators relevant histories are about. The start times 1003 indicate times at which the target excavators 1002 started loading work, and the end times 1004 indicate times at which the target excavators 1002 ended the loading work.

The target haulage histories 1005 are information for associating the excavator loading histories (each corresponding to one record) and dump truck haulage histories (each corresponding to one record), and the identifiers 901 of the associated dump truck haulage histories are stored therein. For example, in the record with the identifier 1001 of "1," the target haulage history 1005 is "1." That is, it is indicated that the loading work (the record with the identifier 1001 of "1") was loading work corresponding to a record on the dump truck side with the identifier 901 of "1" in FIG. 9. This association by using the target haulage histories 1005 is explained below by using FIG. 11.

The locations 1006 indicate the names of areas in which the relevant excavators were operating at the relevant times.

Figure 11:
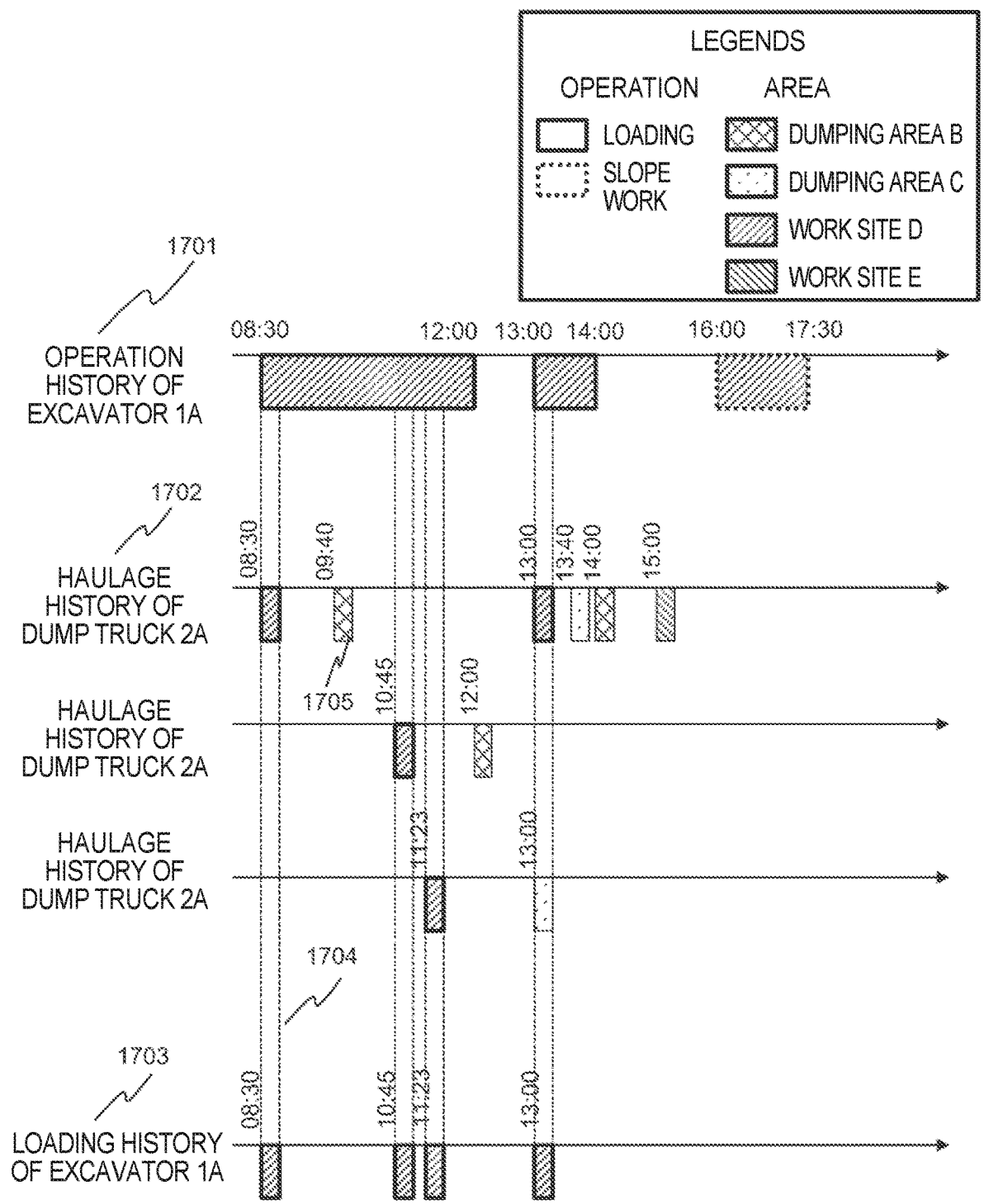
FIG. 11 is a figure for explaining a relationship among an operation history of an excavator, haulage histories of dump trucks, and a loading history of the excavator in the embodiment.

FIG. 11 is a figure illustrating a relationship among the operation history, the haulage history of dump trucks and the loading history of excavators explained with reference to FIGS. 8, 9, and 10. At the row with a reference sign 1701, an operation history of an excavator is illustrated along a horizontal time axis. Rectangular hatched portions indicate areas, and types of frame lines indicate operation states. The types of hatching and the types of frame lines are as defined by a legend indicated in FIG. 11. At the rows with a reference sign 1702, a haulage history of each dump truck is illustrated along a horizontal time axis. Rectangular hatched portions indicate areas. At the row with a reference sign 1703, a loading history of the excavator is illustrated along a horizontal time axis.

In the present embodiment, the excavator loading history 236 in FIG. 10 is generated from the operation history 1701 (operation information) of the excavator, and the haulage histories 1702 of the dump trucks in FIG. 11. The history of loading by an excavator 1A is illustrated as an example in FIG. 11, and it can be known that the excavator 1A was performing "loading" at the "work site D" from 08:30 to 12:00. The loading history 1703 of the excavator 1A is generated by searching for information indicating whether or not there are traces of a dump truck 2 having come to the same "work site D" in this period. Since a dump truck 2A was staying at the "work site D" in a period 1704 in FIG. 11, this history is set as a loading history of the excavator 1A. In this manner, a history is set as a loading history if operation time of the excavator 1 in a work area matches time when a dump truck entered the same work area.

On the other hand, since it can be known that in a period 1705 the same dump truck 2A was at the "dumping area B," not the "work site D" where the excavator 1A was at in the period, this history is not set as a loading history of the excavator 1A. In this manner, loading histories of the excavator 1A are generated from a relationship among areas where the excavator 1A was staying at. In addition, the same technique is applied to other excavators 1, and loading histories are generated if operation information is obtained.

Figure 12:
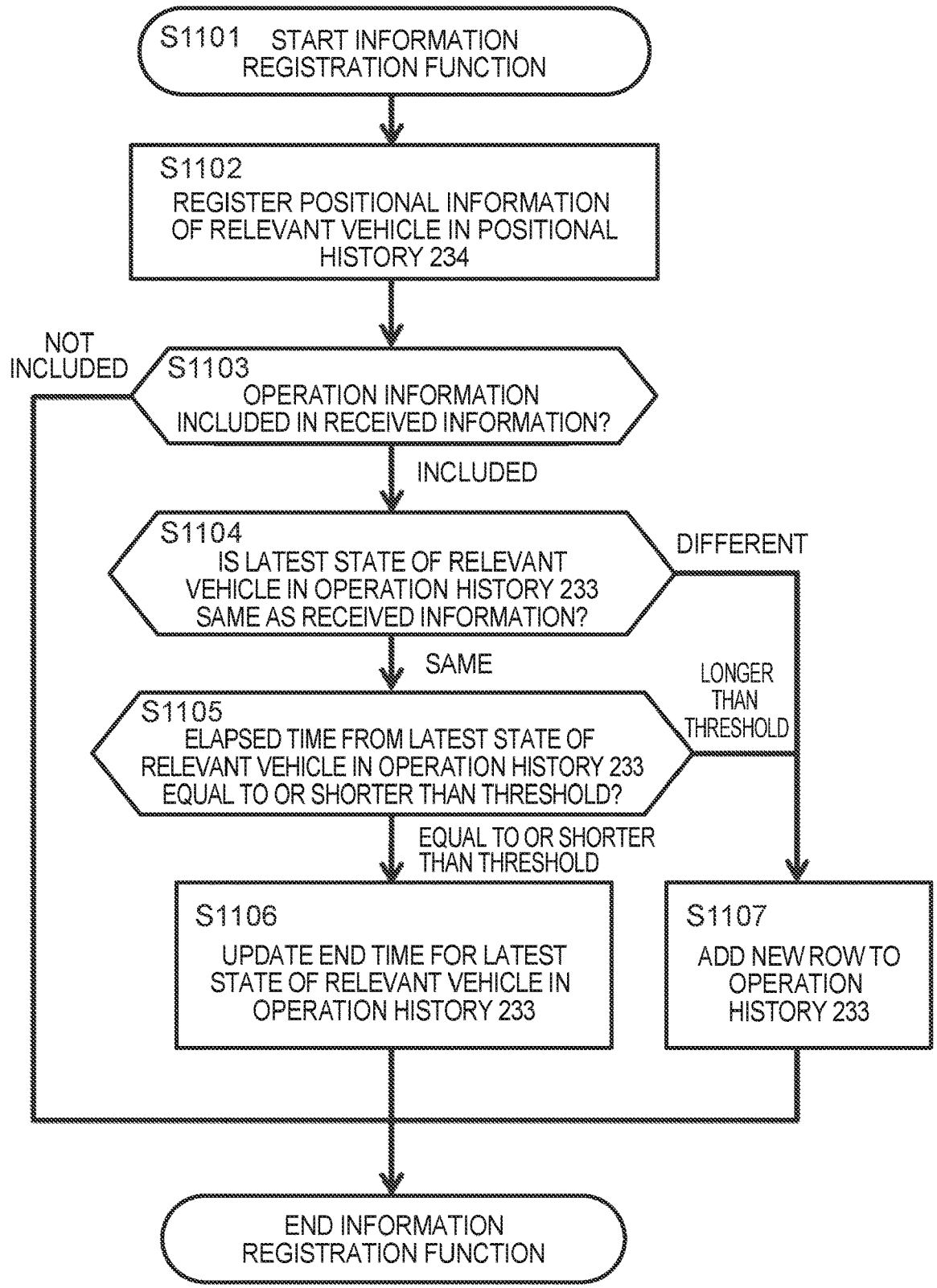
FIG. 12 is a flowchart of data registration in the embodiment.

FIG. 12 is a flowchart illustrating exemplary operation to be performed at the time of registration of the positional history 234 and the operation history 233 by the information registering section 221.

If positional information, operation information and the like are received from a communication terminal 4, the construction site management device 6 executes the registration program, and triggers the function of the information registering section 221 (S1101). At S1102, the information registering section 221 registers, in the positional history 234, positional information of relevant vehicles and relevant persons included in the received information. Although the information registered here is an ID, time information, GPS positioning values and an azimuth for each excavator 1 or dump truck 2, the speed of movement obtained from the positional information and the time information, or the like may be registered as well.

At S1103, the information registering section 221 checks whether or not operation information is not included in the received information. If operation information is included, the process proceeds to S1104, and if operation information is not included, the process is ended.

At S1104, the information registering section 221 checks whether the latest state of a relevant vehicle in the operation history 233 is the same as that in the received information. For example, if a target unit of heavy equipment is the excavator 1A in the state of the operation history 233 as illustrated in FIG. 8, the latest state is "slope work." If this state and the state in the currently received information are the same, the information registering section 221 proceeds to S1105, and if they are different, the information registering section 221 proceeds to S1107.

At S1105, the information registering section 221 checks whether the elapsed time from an end time 804 of the latest state of the relevant vehicle in the operation history 233 is equal to or shorter than a threshold. If the elapsed time is equal to or shorter than the threshold, the process proceeds to S1106, and if the elapsed time is longer than the threshold, the process proceeds to S1107.

At S1106, the information registering section 221 assumes that the most recently updated state is lasting, updates the end time 804 for the latest state of the relevant vehicle in the operation history 233, and ends the process.

On the other hand, at S1107, the information registering section 221 adds a new row to the operation history 233, and ends the process. At this time, the information registering section 221 sets a start time 803 of the new row, and the end time 804 of the row which has been treated as the processing target up to that point to the same current time.

For example, assuming that the operation history 233 is in the state of FIG. 8, and the threshold is ten minutes, if operation information indicating "bucket operation" (see FIG. 15 mentioned below) which is one type of operation representing that "slope work" is being performed is received from the excavator 1A (or if "bucket operation" is derived from the operation information) at 17:32, the information registering section 221 updates the end time 804 of a row with the ID 801 of "4" to 17:32. On the other hand, if operation information indicating "swing" (see FIG. 15 mentioned below) which is one type of operation representing that "loading" or "excavation" is being performed is received from the excavator 1A (or if "swing" is derived from the operation information), information is newly set for a row with the ID 801 of "5." At this time, a start time 803 of the row with the ID 801 of "5" and the end time 804 of the row with the ID 801 of "4" are both set to 17:32.

The decision at S1105 is additionally explained. If a communication terminal 4 located on the side of an excavator 1 or a dump truck 2 is operating correctly, the communication terminal 4 repeatedly sends positional information, operation information and the like. On the other hand, if the communication terminal 4 is not operating because the engine is stopped or for other reasons, the communication terminal 4 does not send information during this non operation period. To decide whether the received positional information and operation information are data that is sent repeatedly regularly, the information registering section 221 performs the threshold decision at S1105. Then, if the elapsed time is equal to or shorter than the threshold, the information registering section 221 decides that the same state is lasting, and changes the end time 804 of the same row. On the other hand, if the elapsed time is longer than the threshold, the information registering section 221 decides that operation to stop engine or the like was performed temporarily even if it is indicated that the state is the same, and a row is newly provided, and registered in the operation history 233.

Figure 13:
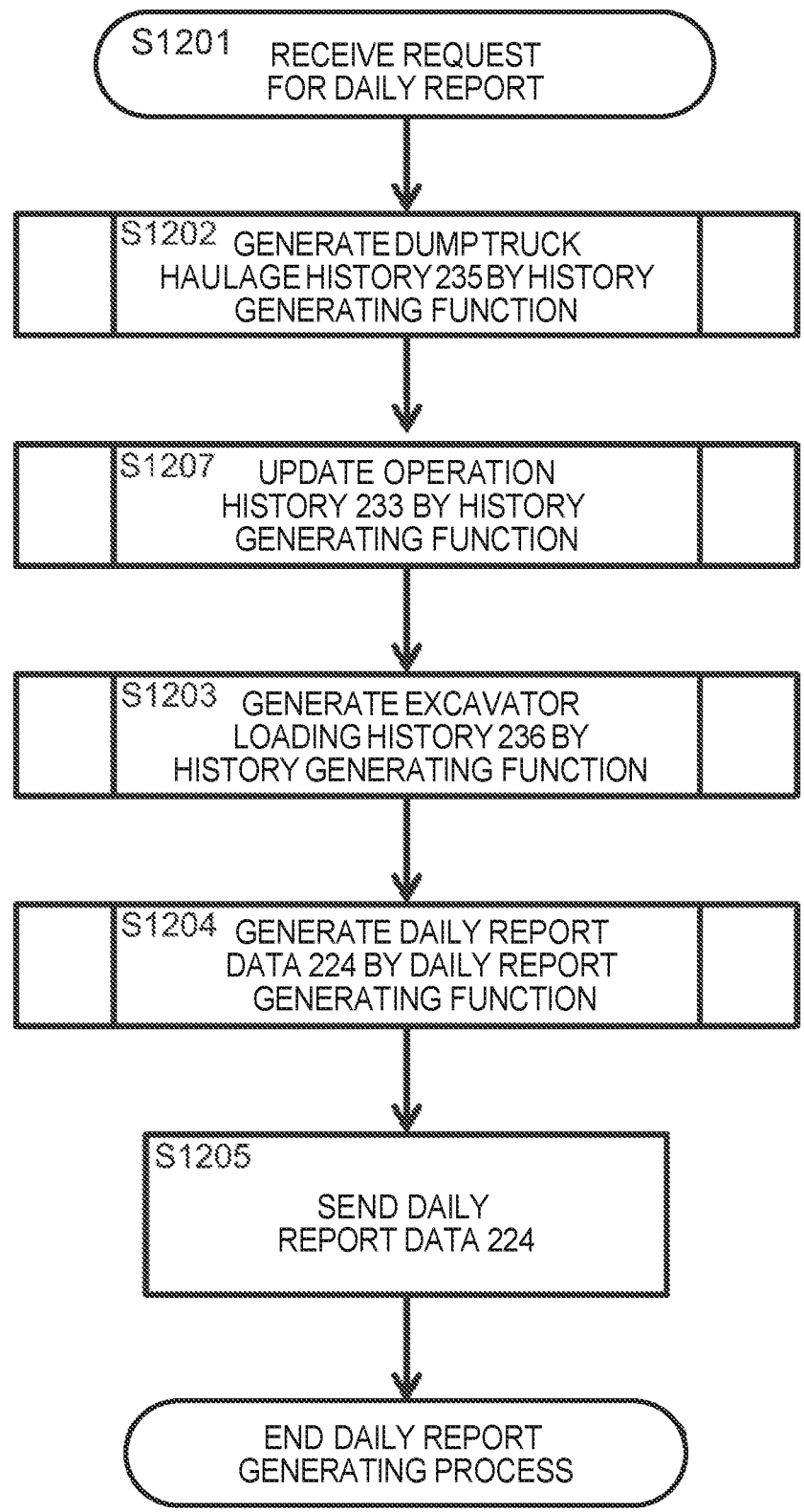
FIG. 13 is a flowchart of daily report generation in the embodiment.

FIG. 13 is a flowchart illustrating exemplary entire operation to be performed when a daily report is generated, and output as a form by the daily report acquiring section 212. If a request to output a daily report is received from the operation terminal 7, the construction site management device 6 executes the daily report acquiring program, and triggers the function of the daily report acquiring section 212 (S1201).

At S1202, the history generating section 222 in the daily report acquiring section 212 updates the dump truck haulage history 235 by using the positional history 234 and the site information 232, and proceeds to S1207. Details of S1202 are explained below by using FIG. 14. At S1207, the history generating section 222 updates the operation history 233 of the excavator by using the positional history 234 and the operation history 233, and proceeds to S1203. Here, the history generating section 222 updates the state 805 in the operation history 233 of the excavator such that the state 805 indicates one of "loading," "excavation" and "slope work." Details of S1207 are explained by using FIG. 15.

At S1203, the history generating section 222 updates the excavator loading history 236 by using the positional history 234, the operation history 233, and the site information 232, and proceeds to S1204. Details of S1203 are explained by using FIG. 16.

At S1204, the daily report generating section 223 generates the daily report data 224 by using the dump truck haulage history 235, the excavator loading history 236 and the site information 232 updated at S1202, S1207, and S1203, and proceeds to S1205. Details of S1204 are explained by using FIG. 17. At S1205, the daily report generating section 223 outputs the generated daily report data 224 to the operation terminal 7, and ends the process.

Figure 14:
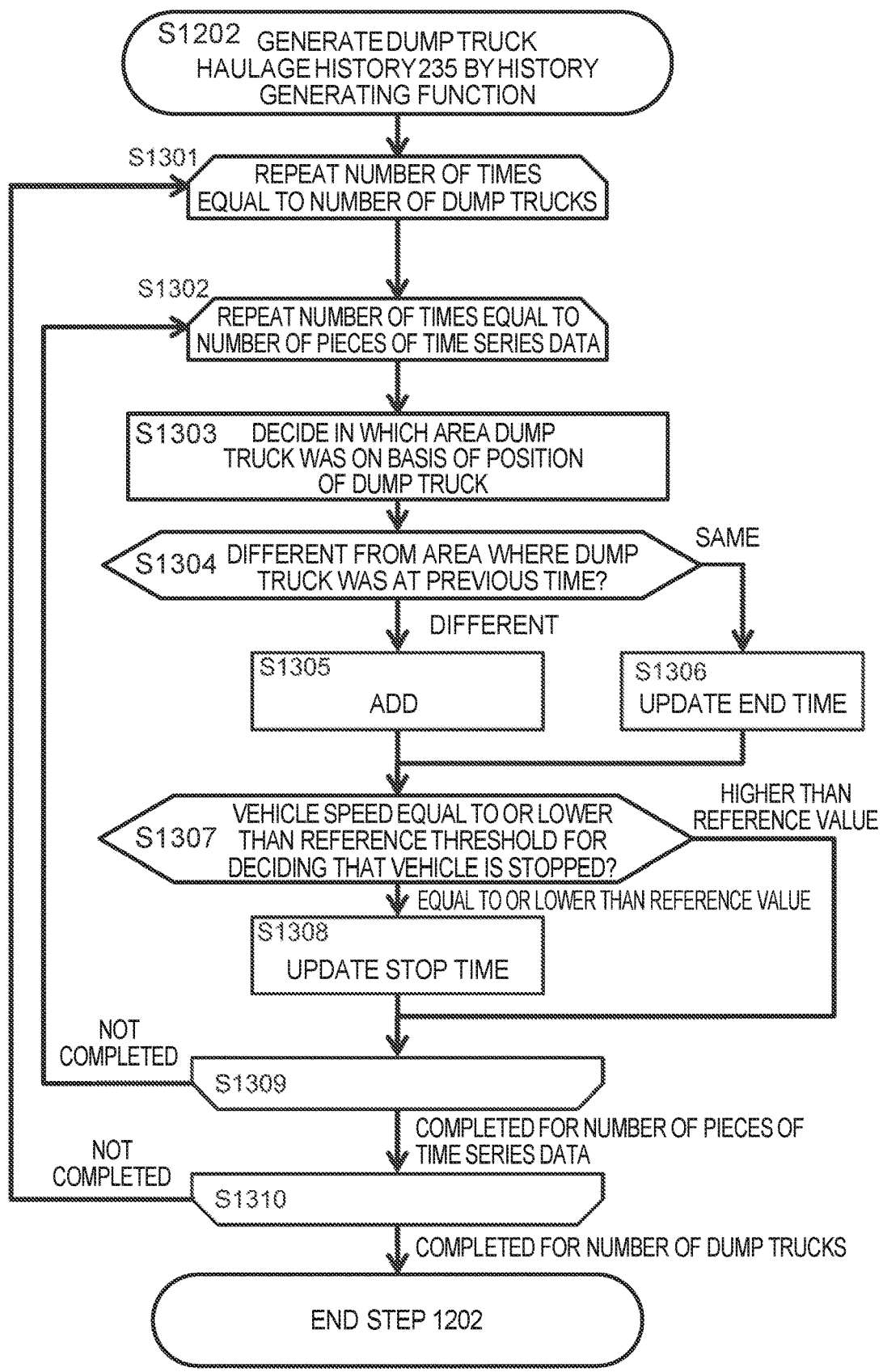
FIG. 14 is a flowchart of a process of estimating work of a dump truck at the time of daily report generation in the embodiment.

FIG. 14 illustrates a flowchart of estimating work of a dump truck, and generating the dump truck haulage history 235 in the process of generating and outputting a daily report by the daily report acquiring section 212. This flow is invoked at S1202 in FIG. 13.

At S1301, the history generating section 222 acquires the positional history 234, extracts dump trucks from the positional history 234 and executes the following loop processing for each of the dump trucks. The history generating section 222 proceeds to S1302 inside this loop. At S1302, the history generating section 222 sorts pieces of data of a relevant dump truck in a time series, and executes the following loop processing for each time. The history generating section 222 proceeds to S1303 inside this loop.

At S1303, on the basis of relevant positional information and the site information 232, the history generating section 222 decides an area where a target dump truck is, and proceeds to S1304. At S1304, the history generating section 222 decides whether or not the area detected at S1303 is the same as an area detected at the previous time step. If the areas are the same, the process proceeds to S1306, and if the areas are different, the process proceeds to S1305.

At S1305, the history generating section 222 additionally registers, in the dump truck haulage history 235, information of an area where the dump truck newly entered. At this time, the history generating section 222 registers one of serial numbers in the ID 901, and the name of the relevant vehicle in the target dump truck 902. In addition, the history generating section 222 sets the start time 903 to a detection time of the time series data being processed, the end time 904 to the same value as the start time 903, and the stop time [seconds] 905 to the initial value 0 (zero). In addition, the history generating section 222 sets the state 906 to "not detected" as the initial value, and the location 907 to information of the relevant area, and proceeds to S1307. On the other hand, at S1306, the history generating section 222 updates the end time 904 of the last row in the existing dump truck haulage history 235 to the detection time of the time series data being processed, and proceeds to S1307.

At S1307, the history generating section 222 decides whether the vehicle speed of the relevant vehicle is equal to or lower than a reference threshold (reference value) which is set in advance, and used for deciding that a vehicle has stopped. Note that the vehicle speed is obtained from the time and position registered in the positional history 234. Here, if the vehicle speed is equal to or lower than the reference value, the process proceeds to S1308, and if the vehicle speed is higher than the reference value, the process proceeds to S1309.

At S1308, the history generating section 222 adds, to the value of the stop time 905 of the last row in the existing dump truck haulage history 235, the value of an interval from the previous time step, and proceeds to S1309. At S1309, it is checked whether the process on all pieces of time series data of the relevant vehicle has been completed. If the process has been completed, the process proceeds to S1310, and if the process has not been completed, the process returns to S1302. At S1310, the history generating section 222 checks whether the process on all dump trucks has been completed. If the process has been completed, the history generating section 222 ends the process, and if the process has not been completed, the process returns to S1301.

Figure 15:
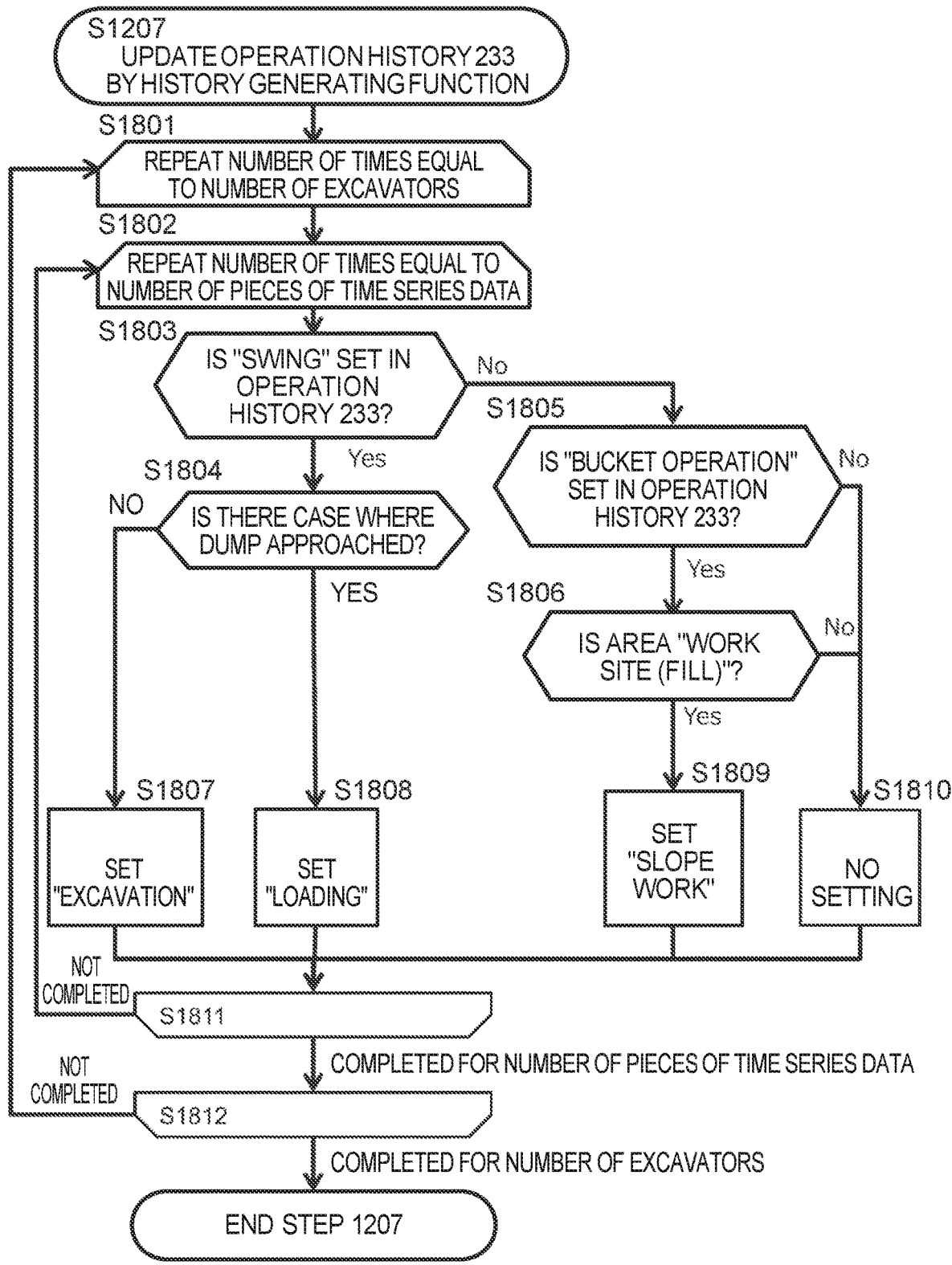
FIG. 15 is a flowchart of updating an operation history of an excavator at the time of daily report generation in the embodiment.

FIG. 15 is a flowchart illustrating exemplary operation of estimating operation of an excavator 1, and updating the state 805 of the operation history 233 of the excavator in the process of generating and outputting a daily report by the daily report acquiring section 212. This flow is invoked at S1207 in FIG. 13.

At S1801, the history generating section 222 acquires the operation history 233, extracts excavators from the operation history 233 and executes the following loop processing for each of the excavators. The history generating section 222 proceeds to S1802 inside this loop. At S1802, the history generating section 222 sorts pieces of data of a relevant excavator in a time series, and executes the following loop processing for each time. The history generating section 222 proceeds to S1803 inside this loop.

The history generating section 222 decides whether a value indicating that the upper structure of the excavator 1 has been swung is set in the operation history 233. If the value is set, the process proceeds to S1804, and if the value is not set, the process proceeds to S1805. At S1804, the history generating section 222 decides whether or not there is a case where a dump truck approached a relevant excavator at a relevant time. At S1804, the positional history 234 of a dump truck is referred to as well, and it is decided whether or not there is a case where the dump truck approached. If there is a case where the dump truck approached, the process proceeds to S1808, and if there is not such a case, the process proceeds to S1807.

At S1807, the history generating section 222 sets a relevant state 805 to "excavation," and proceeds to S1811. At S1808, the history generating section 222 sets a relevant state 805 to "loading," and proceeds to S1811.

At S1805, the history generating section 222 checks whether "bucket operation" is set in the operation history 233. If "bucket operation" is set, the process proceeds to S1806, and if "bucket operation" is not set, the process proceeds to S1810.

At S1806, the history generating section 222 decides whether an area where the excavator 1 was during relevant operation is "work site (fill)," by referring to the site information 232. If the area is "work site (fill)," the process proceeds to S1809, and otherwise proceeds to S1810. At S1809, the history generating section 222 sets the state 805 to "slope work," and proceeds to S1811. At S1810, no processes are performed, and the process proceeds to S1811.

At S1811, the history generating section 222 checks whether the process has been completed for relevant pieces of data. If the process has been completed, the process proceeds to S1812, and if the process has not been completed, the process returns to S1802. At S1812, the history generating section 222 checks whether the process has been completed for the number of excavators that are in operation. If the process has been completed, the process ends, and if the process has not been completed, the process returns to S1801.

With the process in FIG. 15, the state 805 in the operation history 233 is set.

Figure 16:
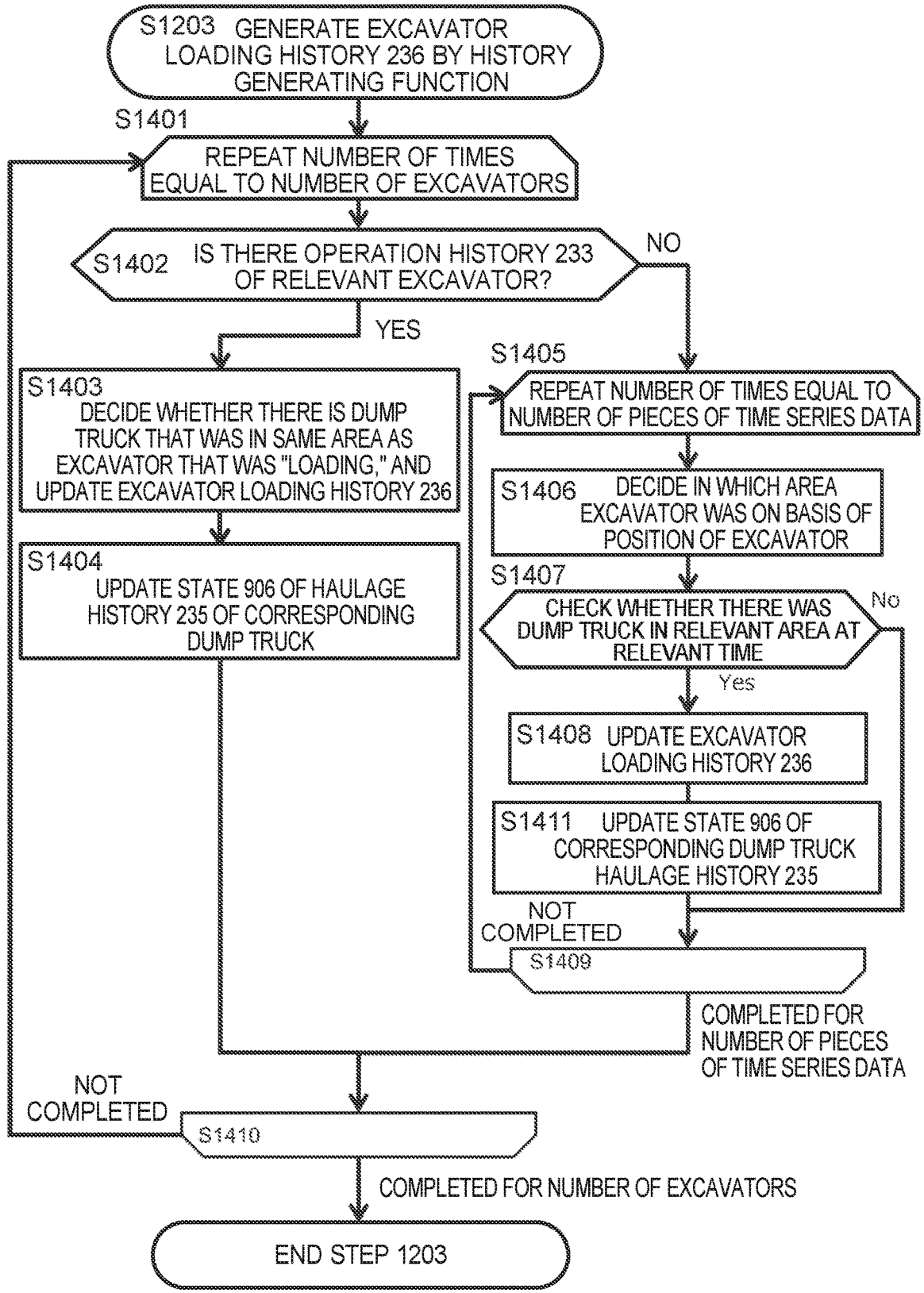
FIG. 16 is a flowchart of process of estimating work of an excavator at the time of daily report generation in the embodiment.

FIG. 16 is a flowchart illustrating exemplary operation of estimating work of an excavator, and generating the excavator loading history 236 in the process of generating and outputting a daily report by the daily report acquiring section 212. This flow is invoked at S1203 in FIG. 13.

At S1401, the history generating section 222 executes the loop processing the number of times equal to the number of excavators in operation. The history generating section 222 proceeds to S1402 inside the loop processing. At S1402, the history generating section 222 checks whether there is an operation history 233 of a relevant excavator, proceeds to S1403 if there is such an operation history 233, and proceeds to S1405 if there is not such an operation history 233. As explained above, if the excavator 1 supports the construction site management system 100, there is an operation history 233 of the excavator. In this case, the history generating section 222 proceeds to S1403. On the other hand, if the excavator 1 does not support the construction site management system 100, there is not an operation history 233 of the excavator. In this case, the history generating section 222 proceeds to S1405, and generates an excavator loading history 236 on the basis of the position of the excavator.

At S1403, the history generating section 222 extracts time during which the state 805 of the operation history 233 of the relevant excavator is "loading," and decides whether there is a dump truck that was in the same area during relevant time on the basis of the dump truck haulage history 235. Then, the history generating section 222 adds a record into the excavator loading history 236 by incorporating an ID 901 of a relevant record registered in the dump truck haulage history 235 into the target haulage history 1005, and proceeds to S1403. In addition, at S1404, the history generating section 222 updates the state 906 of the corresponding dump truck haulage history 235 from the initial value, "not detected," to "detected," and proceeds to S1410.

At S1405, the history generating section 222 executes the loop processing the number of times equal to the number of pieces of data in a time series that are in the detected positional information and correspond to a relevant excavator. The history generating section 222 proceeds to S1406 inside the loop processing.

At S1406, on the basis of relevant positional information and the site information 232, the history generating section 222 decides an area where a target excavator is, and proceeds to S1407. At S1407, on the basis of the dump truck haulage history 235, the history generating section 222 decides whether there was a dump truck in the area where the target excavator was at the same time. If there was a dump truck, the process proceeds to S1408, and if there was not a dump track, the process proceeds to S1409.

At S1408, the history generating section 222 additionally registers a record in the excavator loading history 236 by adding relevant information, and proceeds to S1411. At S1411, the history generating section 222 changes the state 906 of the corresponding dump truck haulage history 235 from the initial value, "not detected," to "detected," and proceeds to S1409. At S1409, the history generating section 222 checks whether the process on all pieces of time series data of the relevant vehicle has been completed. If the process has been completed, the process proceeds to S1410, and if the process has not been completed, the process returns to S1405. At S1410, it is checked whether the process has been completed on all excavators. If the process has been completed, the process is ended, and if the process has not been completed, the process returns to S1401.

Figure 17:
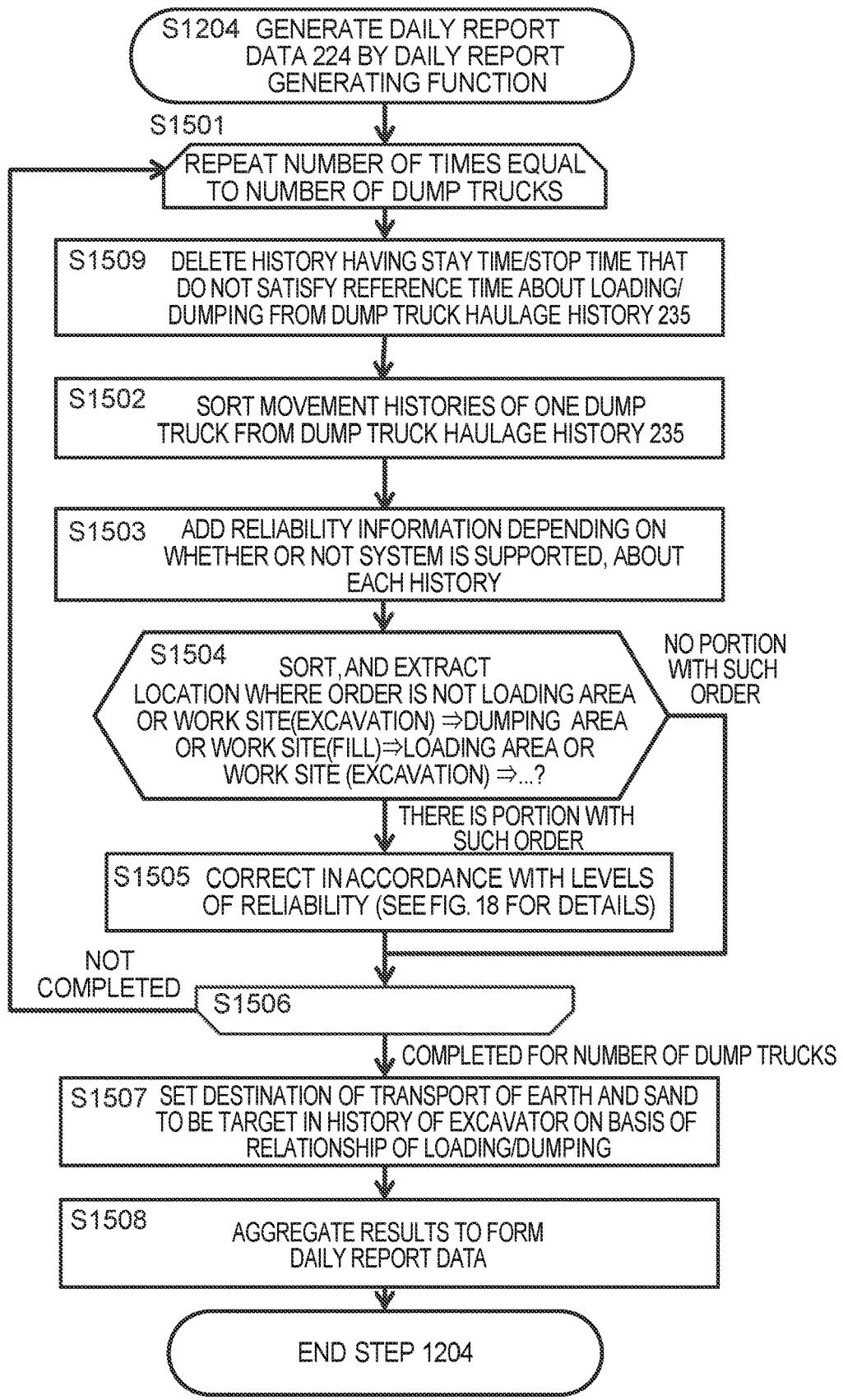
FIG. 17 is a flowchart of deciding traceability of earth at the time of daily report generation in the embodiment.

FIG. 17 is a flowchart of deciding from where to where earth was carried, and generating daily report data on the basis of the dump truck haulage history 235 and the excavator loading history 236 in the process of generating and outputting a daily report by the daily report acquiring section 212. This flow is invoked at S1204 in FIG. 13.

At S1501, the daily report generating section 223 executes the loop processing the number of times equal to the number of dump trucks in operation. The daily report generating section 223 proceeds to S1509 inside the loop processing. At S1509, the daily report generating section 223 checks movement histories of one target dump truck on the basis of the dump truck haulage history 235, deletes histories having stay time and stop time that do not satisfy predetermined loading/dumping reference time, and proceeds to S1502. At S1502, the daily report generating section 223 sorts movement histories of one target dump truck on the basis of the dump truck haulage history 235 in a time series, and proceeds to S1503.

At S1503, the daily report generating section 223 acquires locations 907 in records that are sorted in a time series, and checks the system support 704 of the acquired locations 907 by referring to the site information 232. Then, the daily report generating section 223 adds reliability information on the basis of combinations of the system support 704 and the states 906, and proceeds to S1504. Specifically, the reliability levels are ranked in accordance with the following conditions.
(Condition 1) The reliability level is (high) if a work area is a system "supporting" area, and a dump truck is "detected."
(Condition 2) The reliability level is (low) if a work area is a system "supporting" area, and a dump truck is "not detected."
(Condition 3) The reliability level is (middle) if a work area is a system "non supporting" area, and a dump truck is "detected."
(Condition 4) The reliability level is (middle) if a work area is a system "non supporting" area, and a dump truck is "not detected."

Since Condition 1 explained above indicates that a dump truck is detected correctly in a work area supporting the system, the reliability of the data is set as being high. Note that "detected" is given at S1404 in this case. Condition 2 indicates that a dump truck is not detected in an area supporting the system. Since a dump truck that is supposed to be detected is not detected, the reliability of the data is set as being low in the present embodiment.

Condition 3 corresponds to a case where a dump truck is detected at S1406 to S1411 in an area not supporting the system. In this case, the reliability of the data is set as being middle in the present embodiment. Condition 4 indicates that a dump truck is not detected in an area not supporting the system. Since it is assumed that detection is not possible in the area not supporting the system, the reliability of the data is set as being middle in the present embodiment.

At S1504, the daily report generating section 223 checks an area type of a location in a movement history. Then, the daily report generating section 223 checks whether the order indicates movement of a dump truck from a loading area or a work site (excavation) to a dumping area or a work site (fill), and then movement from the dumping area or the work site (fill) to a loading area or a work site (excavation). If there is a portion not indicating the order, the process proceeds to S1505. If there is not such a portion, the process proceeds to S1506.

At S1505, the daily report generating section 223 performs correction depending on set reliability information, and proceeds to S1506. In what combination what types of processes are to be performed is explained below by using FIG. 18 and FIG. 19. At S1506, the daily report generating section 223 checks whether the process on all dump trucks has been completed. If the process has been completed, the process proceeds to S1507, and if the process has not been completed, the process proceeds to S1501.

At S1507, the daily report generating section 223 checks a record of the dump truck haulage history 235 that was used as a target in the target haulage history 1005 of the excavator loading history 236, and the next record of the same dump truck, and extracts a location 907 to be a target. Then, the daily report generating section 223 sets the area as a haulage destination, and proceeds to S1508. At S1508, the daily report generating section 223 aggregates results obtained up to that point to generate daily report data, and ends the process.

Figure 18:
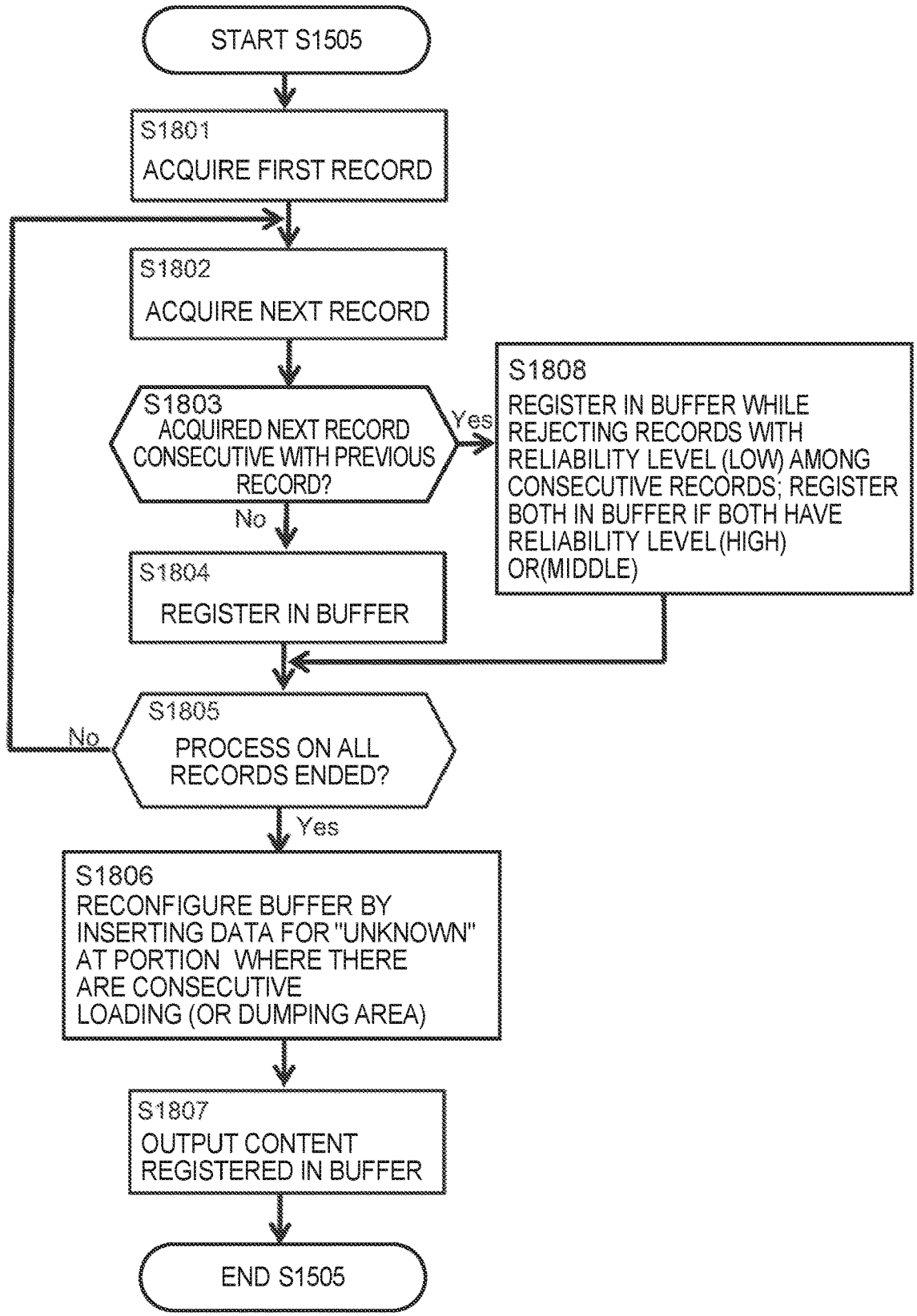
FIG. 18 is a flowchart of a reliability-based correction process in the embodiment.

FIG. 18 is a flowchart illustrating an example of the correction process according to reliability levels at S1505. The correction process at S1505 is explained by referring to FIG. 18. At S1801, the daily report generating section 223 acquires the first record of history data decided as having an inappropriate portion at S1504, and acquires the next record at S1802.

At S1803, the daily report generating section 223 decides whether the next record acquired at S1802 and the previous record are consecutive records. Here, it is decided whether they are consecutive records of "loading area or work site (excavation)" or consecutive records of "dumping area or work site (fill)" which are not supposed to be consecutive. If those consecutive records are found, the process proceeds to S1808, and if those consecutive records are not found, the process proceeds to S1804.

At S1804, the daily report generating section 223 registers the record acquired at S1803 in a buffer region. Note that if the first record is not registered, here it is registered in the buffer region. Then, at S1805, the daily report generating section 223 decides whether the process has been completed on all records in relevant history data. If there is a record that has not been processed, the daily report generating section 223 returns to the process at S1802. If the process has been completed on all the records, the daily report generating section 223 proceeds to S1806.

On the other hand, at S1808, the daily report generating section 223 rejects and deletes one of consecutive records which has the reliability level (low), and registers the remaining record in the buffer region. If the both records have the reliability level (high) or the reliability level (middle), the daily report generating section 223 registers the both records in the buffer region. Note that if the both records have the reliability level (low), a flag indicating this is given, and one or both of the records may be registered. After S1808, the daily report generating section 223 proceeds to S1805, and decides whether the process has been completed on all records.

At S1806, the daily report generating section 223 inserts data for "unknown" between portions where there are consecutive records of "loading area or work site (excavation)" or portions where there are consecutive records of "dumping area or work site (fill)," and reconfigures data in the buffer region. Since pieces of data that are consecutive at this step all have the high reliability levels (or the middle reliability levels), here, they are treated as data in which there are missing pieces between the consecutive pieces of data. Accordingly, in the present embodiment, the daily report generating section 223 inserts history data whose work areas are "unknown" between consecutive portions.

At S1807, the daily report generating section 223 outputs, as outcome data, the reconfigured data in the buffer region, and thereby ends the correction process according to reliability levels. Note that the daily report generating section 223 may unconditionally replace consecutive portions with data for "unknown" irrespective of reliability levels.

FIG. 19 is a figure illustrating output results after correction. In addition, FIG. 19 illustrates a result after correction of each of three provided case patterns.

Case 19-A is a case where there are consecutive "loading area or work site (excavation) A" and "loading area or work site (excavation) B," and consecutive "dumping area or work site (fill) C" and "dumping area or work site (fill) D." In addition, in any of them, the reliability level is (high) or (middle). In this case, the daily report generating section 223 treats the entire data as reliable data, and inserts "unknown" between consecutive portions. That is, the daily report generating section 223 makes a correction such that the order indicates the loading area A, an unknown dumping area, the loading area B, the dumping area C, an unknown loading area, and the dumping area D (descriptions of work site (excavation) and work site (fill) are omitted; this applies also to the following explanation).

Case 19-B is a case where there are a consecutive loading area A and loading area B, and a consecutive dumping area C and dumping area D. In addition, records of the loading area A and the dumping area C have the reliability level (high) and the reliability level (middle), and the loading area B and the dumping area D have reliability levels (low). In this case, the daily report generating section 223 rejects the loading area B and the dumping area D with the reliability levels (low) from the consecutive portions. That is, the daily report generating section 223 makes a correction such that the order indicates the loading area A and the dumping area C, by deleting the loading area B and the dumping area D.

Case 19-C is a case where there are a consecutive loading area A and loading area B, and a consecutive dumping area C and dumping area D, but records of the loading area A and the dumping area C have reliability levels (low), and the loading area B and the dumping area D have reliability levels (high) and (middle) in this case. In this case, the daily report generating section 223 rejects the loading area A and the dumping area C with the reliability levels (low) from the consecutive portions. That is, the daily report generating section 223 makes a correction such that the order indicates the loading area B and the dumping area D, by deleting the loading area A and the dumping area C.

As explained above, according to the present embodiment, the correction process can be performed by performing tracing of earth as much as possible to find out from where to where earth was carried, and excluding or interpolating data depending on reliability levels of data for portions where there is a contradiction in terms of movement of earth.

The daily report generating section 223 organizes each piece of data derived in the manner as explained above, performs an aggregation process as necessary, and furthermore acquires various types of data (site names, dump truck names, heavy equipment names, drivers, etc.) from a master table. Then, the daily report generating section 223 displays the data on a screen as daily report data like the ones illustrated in FIG. 4 to FIG. 6, and performs form-output (print-out). In addition, for example if the system collaborates with a work progress system, a wage managing system, an accounting system or the like, the daily report generating section 223 may output data in a form that allows collaboration with the system.

Although work daily reports are mentioned as work result data to be created in the embodiment explained above, work result data to be created may be weekly reports, monthly reports, annual reports and the like. In addition, although work result data is explained as being created in a defined period such as days, this is not the sole example, and the system is allowed to operate at any timing to create work result data.

Although a hydraulic excavator is illustrated as one example of loading machines, it may be a wheel loader or may be a machine that performs lifting work such as a crawler crane. That is, loading machines to which the present invention is applied may be any machines that can load objects onto load bodies of haulage vehicles.

According to the present embodiment, it is possible to know the traceability of earth in terms of how much earth, as measured in $m^3$, was loaded and how much earth, as measured in $m^3$, was dropped in which work area, by means of the GPS function, on the basis of operation information sent from a loading machine and equipment, and on the basis of the specific gravity of earth and load weights of haulage vehicles. In addition, if the position of a haulage vehicle cannot be identified due to defects of the GPS function or erroneous sensing, it is possible to know the traceability of earth on the basis of a relationship with operation information sent from a loading machine or equipment supporting the construction site management system 100. In addition, if work was performed in a non supporting work area such as a work area where a loading machine supporting the construction site management system 100 is not arranged, it is possible to know the situation of loading and dumping by positional detection of haulage vehicles by means of the GPS function.

In addition, even time when a unit of heavy equipment stopped in a work area can be known by applying the present embodiment. Therefore, by deciding whether there is such stop time, it becomes possible also to decide whether earth was loaded in the work area.

In addition, in the present embodiment, even if there is an inconsistency in the sequence of round trips between works areas such as loading areas and dumping areas, it is possible to delete or interpolate histories of visits of dump trucks depending on the reliability levels that are set on the basis of whether the work areas support the construction site management system 100. By making such a correction, the reliability level of result data can be improved.

In the aspect explained in the present embodiment, work result data indicating from which work area to which work area a load was hauled is output. As examples of the work result data, the reference signs 411 to 414 in FIG. 4, the reference signs 511 to 516 in FIG. 5, and the reference signs 622 to 627 in FIG. 6 were illustrated. In addition, although earth and sand were illustrated as an example of a load to be hauled in the present embodiment, the present invention can be applied also to construction materials, industrial wastes and the like other than earth and sand, such as reinforcing bars or concrete, for example.

In the present embodiment, a construction site management device (6) that creates result data of load and haul between a plurality of work areas was explained. The construction site management device of the present embodiment has a receiving section (202) that receives operation information sent from the loading machine in a work area and indicating whether operation related to loading has been performed, and positional information sent from a haulage vehicle. The construction site management device has a registering section (211) that stores a positional history (234) in a storage section on the basis of the positional information, and stores an operation history (233, FIG. 8) in the storage section on the basis of the operation information, the positional history including, in association with each other, a position of the haulage vehicle, and information of time when the haulage vehicle has been at the position, the operation history including, in association with each other, a content of work of the loading machine performed in the work area, and information of time when the work has been performed.

The construction site management device of the present embodiment has a history creating section (222) that creates a haulage history (235, FIG. 9) indicating from when and till when the haulage vehicle has entered the work area on the basis of the positional history, and creates a loading history (236, FIG. 10) indicating time when the loading machine has performed loading work for the haulage vehicle, and a work area in which the loading machine has performed the loading work for the haulage vehicle, the loading history being created on the basis of the haulage history and the operation history.

The construction site management device of the present embodiment has a work result data creating section (223) that outputs work result data (224, FIG. 4 to FIG. 6) indicating from which work area to which work area a load has been hauled, the work result data being output on the basis of the haulage history and the loading history that are created by the history creating section.

By outputting work result data by taking into consideration positional information, and operation information indicating operation contents of loading machines in the manner explained in detail above, it is possible to output highly precise work result data, and to reduce management tasks. In addition, even if there are defects of positional detection or not all work areas are supporting the system, the work progress can be known.

Note that the present invention is not limited to the embodiment explained above, but include various modifications. For example, the embodiment explained above is explained in detail in order to explain the present invention in an easy-to-understand manner, and the embodiment is not necessarily limited to the one including all the configurations that are explained. In addition, some of the configurations of an embodiment can be replaced with configurations of another embodiment, and configurations of an embodiment can be added to the configurations of another embodiment. In addition, some of the configurations of each embodiment can be subjected to addition, deletion or replacement of other configurations. In addition, each configuration, function, processing section, processing means or the like that is explained above may be partially or entirely realized by hardware for example by designing it in an integrated circuit or by other means. In addition, each configuration, function or the like that is explained above may be realized by software by a processor interpreting and executing a program to realize each function. Information such as a program, a table, or a file to realize each function can be placed in a recording device such as a memory, a hard disk, or an SSD (Solid State Drive), or a recording medium such as an IC card, an SD card, or a DVD.

REFERENCE SIGNS LIST

1: excavator
2: dump truck
4: communication terminal
5: base station
6: construction site management device
7: operation terminal
8: satellite positioning system
100: construction site management system
211: registering section
212: daily report acquiring section
221: information registering section
222: history generating section
223: daily report generating section

The invention claimed is:

1. A construction site management device that creates result data of loading and hauling between a plurality of work areas and outputs the result data to an operation terminal, the construction site management device comprising:

a storage device;

a communication interface that receives, via a network, satellite positioning system positional information and operation information sent from respective communication terminals mounted on each of a loading machine and a haulage vehicle along with time information;

a central processing unit (CPU) coupled to the storage device and the communication interface; and a memory coupled to the CPU, wherein the memory stores instructions, that when executed by the CPU, configure the CPU to:

receive the operation information indicating an operation content, which includes a loading operation of the loading machine in a work area to be a loading area, based on a sensor on the loading machine, the satellite positioning system positional information sent from the loading machine along with the time information, and the satellite positioning system positional information sent from the haulage vehicle along with the time information, upon receiving the positional information and the operation information, store in the storage device, a positional history based on the positional information and an operation history based on the operation information of the loading machine, the positional history including, in association with each other, positions of the loading machine and the haulage vehicle, and time information indicating when the loading machine and the haulage vehicle were at respective positions, the operation history including, in association with each other, a content of work including the loading of the loading machine performed in the work area to be the loading area, time information indicating when the work was performed, and the work area, in response to receiving a request from the operation terminal via the network to acquire a daily report, create a haulage history having a plurality of records each indicating respective times when the haulage vehicle has entered the work area to be the loading area and a dumping area based on the positional history of the haulage vehicle and predetermined construction site information of the work area, and create a loading history indicating respective times when the loading machine performed loading work for the haulage vehicle, and a work area being the loading area in which the loading machine performed the loading work for the haulage vehicle, the loading history being created by acquiring respective times when the loading machine is performing loading work based on the time information and content of the operation history, and determining whether the respective times and work areas match respective times and loading areas of the haulage history of the haulage vehicle, and upon determining the match, add information indicating the haulage vehicle is detected to a record of the haulage history, for each record in the haulage history, determine whether the record is of high reliability or low reliability based on whether the work area is supported or unsupported by referring to the construction site information and based on whether the record indicates the haulage vehicle is detected, the work area being supported when operation information is obtainable from the work area and the work area being unsupported when operation information is not obtainable from the work area, execute a correction process of the haulage history by determining whether there are inconsistencies based on consecutive work areas of consecutive records of the haulage history in a chronological order of each record of the haulage history, create a summary daily report based on the correction process and the haulage history, the created summary daily report including work result data indicating a respective work area to be the loading area, a respective work area to be the dumping area, and an amount of a load hauled between the respective loading area and the respective dumping area, and upon determining there are inconsistencies, add information to the created summary daily report indicating an area is unknown between the consecutive records of the haulage history having high reliability and delete the consecutive records of the haulage history having low reliability, and output the created summary daily report to the operation terminal to be displayed on the operation terminal.

2. The construction site management device according to claim 1,
wherein the CPU is further configured to set an area type indicating the loading area or the dumping area for each of the plurality of work areas, and
if the work areas indicated in the consecutive records of the haulage history are loading areas consecutively or dumping areas, the work result data that is output indicates that the work areas are unknown.

3. The construction site management device according to claim 1,
wherein the CPU is further configured to set the plurality of work areas as being a supported area where the loading machine that can send the operation information is arranged or as being the unsupported area where the loading machine that can send the operation information is not arranged, and an area type indicating whether a loading area or a dumping area is set for each of the plurality of work areas.

4. The construction site management device according to claim 1,
wherein the CPU is further configured to:
based on the positional history, derive a time of a stop when the haulage vehicle has stopped in the work area and a time of a stay when the haulage vehicle has stayed in the work area, and create a record of the haulage history including the time of the stop and the time of the stay, and
if the time of the stop and the time of the stay included in the record of the haulage history are shorter than a predetermined threshold, delete the record of the haulage history having the time of the stop and the time of the stay shorter than the predetermined threshold.

5. The construction site management device according to claim 1,
wherein the CPU is further configured to:
set coordinate information indicating an area of a relevant work area for each of the plurality of work areas, and
determine whether the haulage vehicle has entered the work area based on the coordinate information and the positional history.

6. A construction site management system comprising:
a communication terminal disposed on a haulage vehicle;
a construction site management device including:
    a storage device;
    a communication interface that receives, via a network, satellite positioning system positional information and operation information sent from respective communication terminals mounted on each of a loading machine and a haulage vehicle along with time information;
    a central processing unit (CPU) coupled to the storage device and the communication interface; and
    a memory coupled to the CPU,
wherein the communication terminal is provided to a haulage vehicle, acquires positional information of the haulage vehicle, and sends the positional information to the construction site management device, and
wherein the memory stores instructions that, when executed, configure the CPU of the construction site management device to:
receive the operation information indicating an operation content of a loading machine in a work area, the positional information sent from the loading machine along with the time information, and the positional information sent from the communication terminal along with the time information,
upon receiving the positional information and the operation information, store, in the storage device, a positional history based on the positional information and an operation history based on the operation information of the loading machine, the positional history including, in association with each other, positions of the loading machine and the haulage vehicle, and time information indicating when the loading machine and the haulage vehicle were at respective positions, the operation history including, in association with each other, a content of work including the loading of the loading machine performed in the work area to be the loading area, time information indicating when the work was performed, and the work area,
in response to receiving a request from the operation terminal via the network to acquire the daily report, create a haulage history having a plurality of records each indicating respective times when the haulage vehicle has entered the work area to be the loading area and a dumping area based on the positional history of the haulage vehicle and predetermined construction site information of the work area, and create a loading history indicating respective times when the loading machine performed loading work for the haulage vehicle, and a work area being the loading area in which the loading machine performed the loading work for the haulage vehicle, the loading history being created by acquiring respective times when the loading machine is performing loading work based on the time information and content of the operation history, and determining whether the respective times and work areas match respective times and loading areas of the haulage history of the haulage vehicle, upon determining the match, add information indicating the haulage vehicle is detected to a record of the haulage history, for each record in the haulage history, determine whether the record is of high reliability or low reliability based on whether the work area is supported or unsupported by referring to the construction site information and based on whether the record indicates the haulage vehicle is detected, the work area being supported when operation information is obtainable from the work area and the work area being unsupported when operation information is not obtainable from the work area, execute a correction process of the haulage history by determining whether there are inconsistencies based on consecutive work areas of consecutive records of the haulage history in a chronological order of each record of the haulage history, create a summary daily report based on the correction process and the haulage history, the created summary daily report including work result data indicating a respective work area to be the loading area, a respective work area to be the dumping area, and an amount of a load hauled between the respective loading area and the respective dumping area, and upon determining there are inconsistencies, add information to the created summary daily report indicating an area is unknown between the consecutive records of the haulage history having high reliability and delete the consecutive records of the haulage history having low reliability, and output the created summary daily report to the operation terminal to be displayed on the operation terminal.

* * * * *